United States Patent [19]

Tanabe et al.

[11] Patent Number: 5,130,807
[45] Date of Patent: Jul. 14, 1992

[54] METHOD AND APPARATUS FOR READING AND COPYING DOCUMENTS HAVING DIFFERENT THICKNESS

[75] Inventors: Eiichi Tanabe; Koichi Miyazaki; Yu Nameki; Kiyoshi Horie, all of Kanagawa, Japan

[73] Assignee: Fuji Xerox Co., Ltd., Tokyo, Japan

[21] Appl. No.: 587,935

[22] Filed: Sep. 25, 1990

[30] Foreign Application Priority Data

Sep. 26, 1989 [JP] Japan .................... 1-250924

[51] Int. Cl.$^5$ .................... H04N 1/23; G03B 27/53
[52] U.S. Cl. .................... 358/296; 358/498; 355/75; 355/311
[58] Field of Search .................... 358/296, 496, 498; 355/50, 75, 311

[56] References Cited

U.S. PATENT DOCUMENTS

| | | | |
|---|---|---|---|
| 3,695,754 | 10/1972 | Washio et al. | 355/75 X |
| 3,947,111 | 3/1976 | Hoppner | 355/50 |
| 4,485,949 | 12/1984 | Gebhart et al. | 355/308 X |
| 4,551,010 | 11/1985 | Miyashita et al. | 355/75 X |
| 4,926,270 | 5/1990 | Sakamoto | 358/498 |
| 4,963,726 | 10/1990 | Checchetti | 358/496 X |
| 4,969,048 | 11/1990 | Hoshino | 358/498 X |
| 4,970,606 | 11/1990 | Shima | 358/498 X |
| 4,977,463 | 12/1990 | Fukuda | 358/400 X |

Primary Examiner—Benjamin R. Fuller
Assistant Examiner—Eric Frahm
Attorney, Agent, or Firm—Finnegan, Henderson, Farabow, Garrett and Dunner

[57] ABSTRACT

In an image read method and device for reading an image on an original, more particularly large size original, pairs of transfer rollers are detachably provided on the insert side and the original discharge side of a platen roller, which is detachably disposed facing a platen glass. Sensors for sensing positions of an original transferred by the transfer roller pairs and the platen roller are provided. Touching and detaching between the transfer roller pairs and the platen roller are sequentially controlled according to the positions of the original as sensed by the sensor.

34 Claims, 14 Drawing Sheets

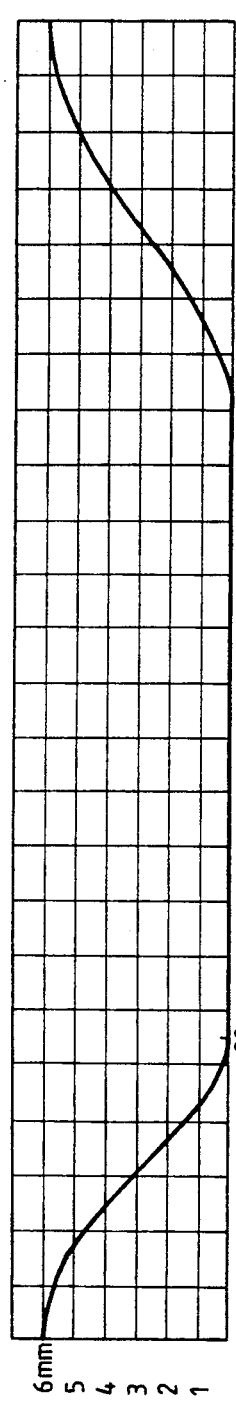
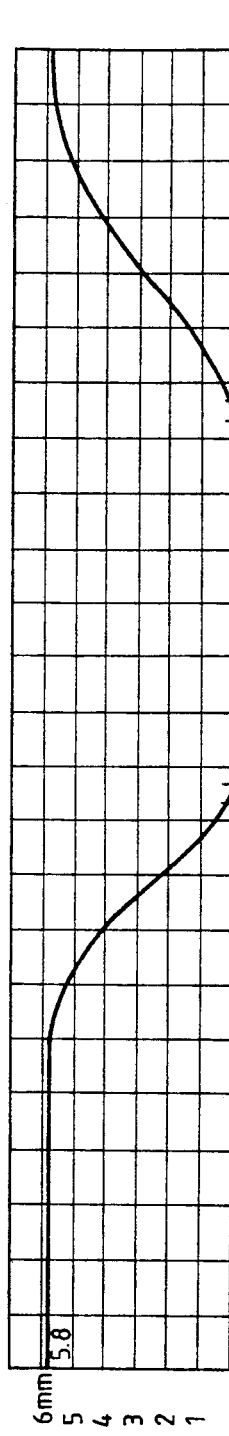
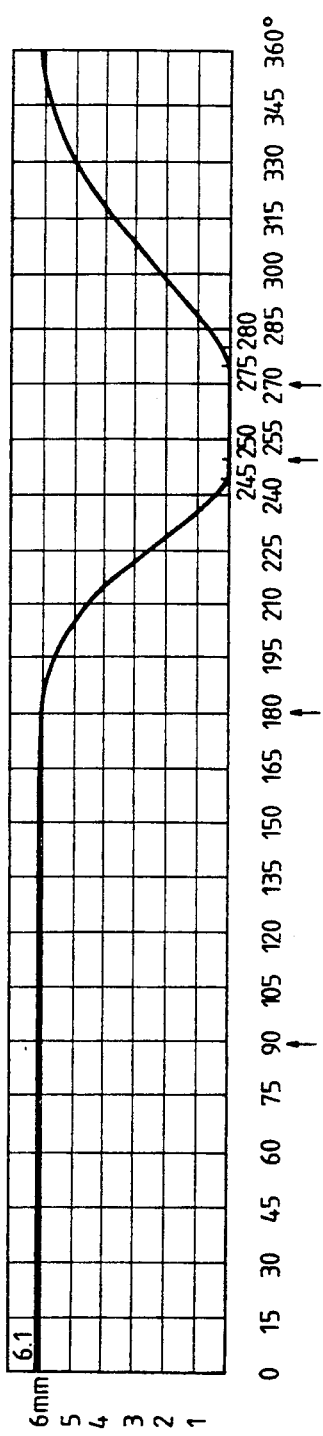
FIG. 7(a)
FIG. 7(b)
FIG. 7(c)

METHOD AND APPARATUS FOR READING AND COPYING DOCUMENTS HAVING DIFFERENT THICKNESS

BACKGROUND OF THE INVENTION

1. Field of the Invention

The present invention relates to a method and an apparatus for reading an image on an original, and a copying method, for the same which may be implemented in a digital or analog copying machine. More preferably, the present invention relates to a method and an apparatus for reading and copying an image on an original of large size, such as a design board.

2. Discussion of the Related Art

In a digital copying machine, an original, e.g., a document, is placed on a glass platen and pictorial information on the document is read by an image sensor of an image reading device and converted into image signals. The image signals are appropriately processed, and are outputted in the form of a reproduced picture on a copy sheet, e.g., copy paper, by means of a xerography unit or a thermal transfer unit.

Generally, in the digital copying machine, the maximum size of a document that can be read (scanned) by the machine is A3. In very large copying machines, the size is B3 at most. While it is possible to read a large document by using a large platen glass, and an optical system designed proportional to the large platen glass, this approach is impractical because the manufacturing cost is extremely large.

There has been known another image reading device that can read a document larger than the platen glass. In the image reading device, a document is moved on the platen glass by utilizing an automatic document feeder. Only thin documents can be read by such an image reading device. Large documents of 4 to 5mm thick and of A4 size, such as a design board, cannot be read by such an image reading device.

SUMMARY OF THE INVENTION

An object of the present invention is to provide an image reading device that solves the problems mentioned above.

Another object of the present invention is to provide an image reading device of simple construction that is able it to read a large thick document.

A further object of the present invention is to prevent the platen glass from being damaged when a large document is read.

Yet another object of the present invention is to copy an image in a specified area on the document to a specified area on a copy paper, while providing smooth transfer of the document during the copying operation.

Still another object of the present invention is to prevent a copying position from being displaced during the copying operation.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

According to the present invention, a method of reading an image on an original is improved in that pairs of transfer rollers are detachably provided on the insert-side and the original discharge-side of a platen roller, which is detachably disposed facing a platen glass. Sensors are provided for sensing positions of an original transferred by the transfer roller pairs and the platen roller. The touching and detaching of the transfer roller pairs and the platen roller are sequentially controlled according to the positions of the original as sensed by the sensor.

The insert-side transfer roller pair, the platen roller, and the discharge-side transfer roller pair are sequentially placed in pressing contact with the platen roller in synchronism with the original transfer of the original document. To prevent the damage of the platen glass, it is desirable that the platen roller be detached from the platen glass immediately before the passage of the trailing edge of the original document.

A copying method according to the present invention comprises the steps of reading an image on a moving original, transferring a copy sheet by a copy sheet transfer unit in synchronism with the moving original, and recording the read image on the copy sheet.

An image in a specified area on an original document can be copied on a specified area on a copy sheet in a manner such that after the original is transferred to a predetermined position, the transfer of the original is stopped. The copy sheet transfer unit starts to transfer the copy sheet. After the copy sheet is transferred up to a predetermined position, the transfer of the original is started again, and the reading of the original image starts again.

An original can be smoothly transferred in a manner that the control for the touching and detaching of the transfer roller pairs and the platen roller is stopped from an instant that the original document reaches the predetermined position until the transfer of the original document starts again.

The displacement of the copying position during the copying operation can be prevented.

Means for detecting the thickness of the original document is provided in an original transfer path, a start point of the control for the touching and detaching of the transfer roller pairs and the platen roller is changed depending on the thickness of the original as detected.

A device for reading an image on an original is improved in the fact that pairs of transfer rollers are detachably provided on the insert-side and the original discharge-side of a platen roller, which is detachably disposed facing a platen glass. Sensors are provided for sensing positions of an original document transferred by the transfer roller pairs and the platen roller. A drive roller mechanism sequentially controls the touching and detaching of the transfer roller pairs and the platen roller according to the positions of the original as sensed by the sensor.

Further, a copy sheet feed tray, which is slanted downward with respect to the original transfer path, may be provided upstream of the insert-side transfer roller pair. Alternatively, a discharge tray, which is swingable, may be provided downstream of the discharge-side transfer roller pair.

An operation of an image reading device according to the present invention will be described in detail. In the description, the insert-side transfer roller pair is located upstream of the platen roller, while the discharge-side transfer roller pair is located downstream of the platen roller.

In the initial state, the rollers of the insert-side transfer roller pair and the discharge-side transfer roller pair, which are on the obverse and reverse sides of an original, and the platen roller are being pushed up by means of a drive mechanism, such as cams. That is, the rollers of each transfer roller pairs are separated from each other, as are the platen glass and the platen roller. Let us insert a thin original into the image reading device. Since the gap between the rollers of the insert-side transfer roller pair is wider than the thickness of the original, the original is smoothly inserted into the gap between the insert-side roller pair. When an original sensor senses the insertion of the original, the rollers of the insert-side transfer roller pair are moved into contact with each other, and the transfer of the original starts. When the original reaches the position of the platen roller, the platen roller presses the original against the platen glass. At this time, the reading of an image on the original through the platen glass starts.

The image from the original progresses. When the original intrudes into the gap between the pair of the discharge transfer rollers, the rollers come into press contact with each other to nip the original. Under this condition, the original is transferred while being nipped by the roller pairs, and the platen roller.

The original is further transferred and the trailing edge of the original document will eventually pass the insert-side transfer roller pair. At this time, the insert-side transfer rollers and the platen roller are released from their press contact state, and the discharge-side transfer rollers are released from the press contact state. The original is discharged from the image reading device.

Other objects, features and advantages of the present invention will be apparent when carefully reading the detailed description in connection with the accompanying drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

FIG. 7(a) through (c) are graphs useful in explaining profiles of cams for driving the rollers;

DETAILED DESCRIPTION OF THE PREFERRED EMBODIMENTS

Figure 3:
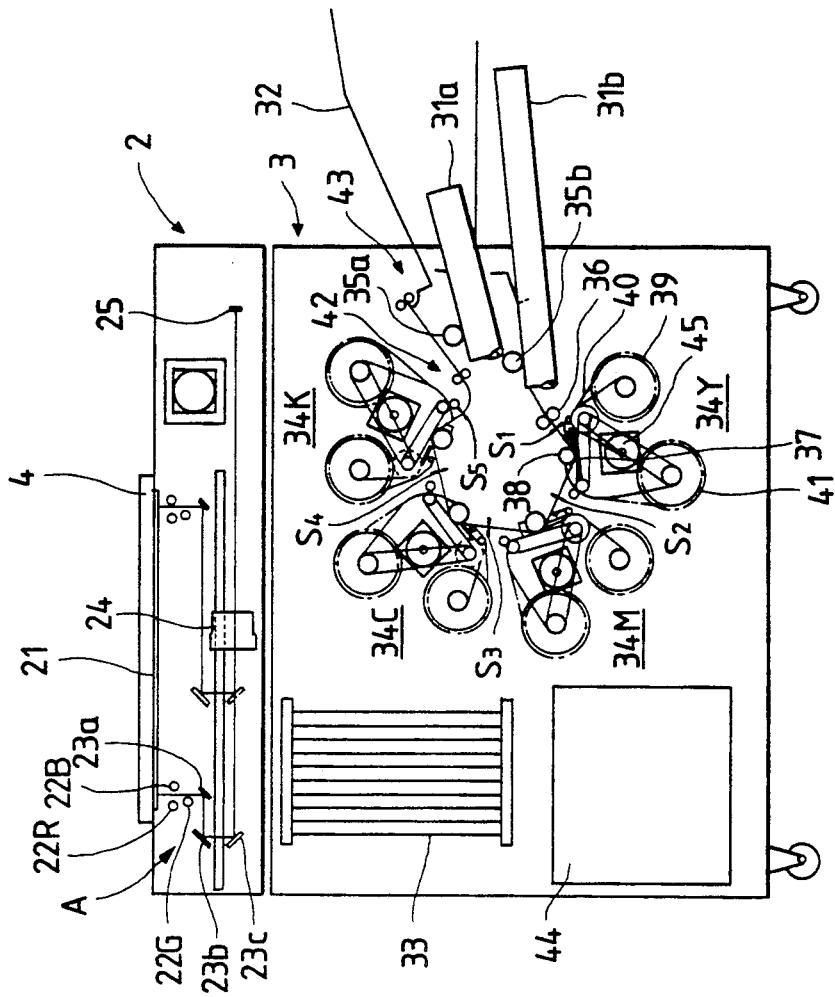
FIG. 3 is a view of the base machine of FIG. 1 showing the interior of the base machine-viewed from the front.

The preferred embodiments of the present invention will be described in detail with reference to the accompanying drawings.

In the instant embodiment, a base machine 1 includes an image read section 2 which is capable of reading an image on a document up to A3 size, and an image output section 3 for forming an image. A platen cover 4 is swingably mounted on the image read section 2. On one side of the base machine are providee copy paper feed trays 31a and 31b for feeding copy papers into the machine, and a discharge tray 32 into which copy papers are discharged.

Figure 1:
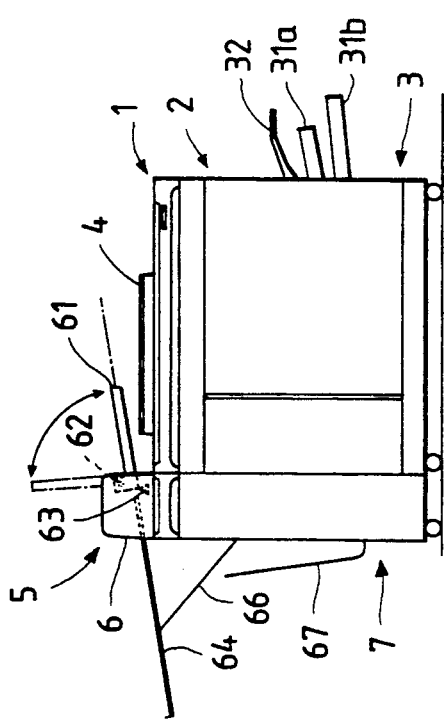
FIG. 1 is a front view showing an overall copying system in which an image reading device according to an embodiment of the present invention is mounted on a base machine of the copying system.
Figure 2:
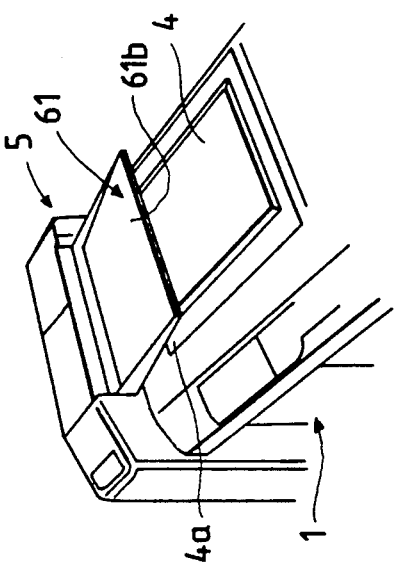
FIG. 2 is a partial perspective view showing the copying system.

An image reading device 5 is removably mounted on the side of the base machine 1, which is opposite to the side of the trays 31a, 31b, and 32. The image read device 5 includes a document transfer section 6 for transferring large documents up to A1 size, such as a design board, and an imaging section 7 for reading an image on a large document up to A2 size and converting an optical signal into an electrical signal. An insertion tray 61 for assisting an operator in inserting the large document into the original transfer section 6 is mounted on the side of the document transfer section 6, which is closer to the base machine 1. The tray 61 may be swingable on a shaft 62. A document support portion 61a, which is expandable, is coupled with the top end of the tray 61. A detect switch 63 for detecting the posture of the tray 61 is provided in the vicinity of a portion of the document transfer section 6 where the tray 61 is mounted. A read mode of the copying system is switched from one to the other according to a state of the switch 63. When the tray 61 is raised as indicated by a two-dot chain line in FIG. 1, the base machine 1 receives an image signal from the image reading section 2, and produces an image based on the input image signal. When the tray 61 is turned down as shown in FIG. 2, the base machine receives an image signal from the image reading device 5, and produces an image based on the image signal.

Figures 4A, 4B:
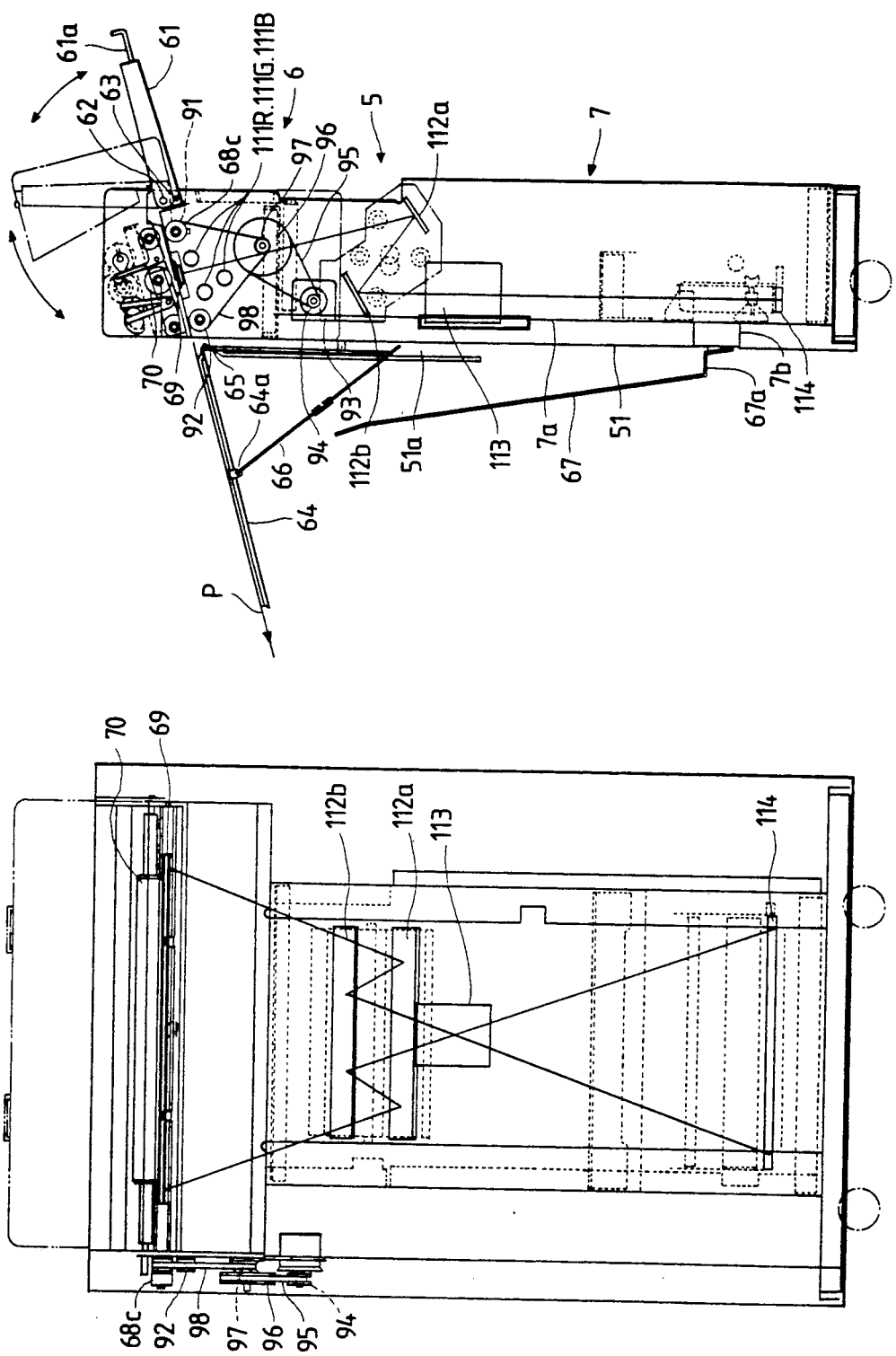
FIGS. 4(a) and 4(b) are views showing the interior of the image reading device, which are respectively viewed from the front and side.

As shown in FIG. 4(b), on the discharge-side of the document transfer section 6 is provided a discharge tray 64 for supporting a large and rigid document, such as a discharged design board. The tray 64 is swingable on a shaft 65. A support bar 66 is provided between a mid portion 64a of the discharge tray 64 and a mid portion 51a on one side of a housing 51 of the document reading device 5. The support bar 66 is foldable, and when expanded, supports the tray 64 in the raised state. A base 67a of a discharge tray 67 is hooked to a bracket 7b mounted on the lower portion of the frame 7a of the imaging optical section 7. Originals, which are flexible, and large but thin, are inserted into the tray 64.

The base machine 1 and the image reading device 5 will be described in detail.

First, the base machine 1 will be described with reference to FIG. 3.

In the image read section 2, a document (not shown) placed on the platen glass 21 of A3 size is sequentially illuminated by exposure lamps 22R, 22G, and 22B of red, green, and blue. The reflected light from the document is imaged on a one-dimensional image sensor 25, through mirrors 23a to 23c and a lens 24. A document scan section A including the exposure lamps 22R, 22G, and 22B, mirrors 23a to 23c, and the like is horizontally movable within a range from a position as indicated by a solid line to a position as indicated by a one-dot chain line, by means of a scan motor (not shown). The image sensor 25 reads images on the document one line at a time in the main scan direction, i.e., the direction orthogonal to the plane of the drawing, and also in the vertical scan direction, i.e., the horizontal direction on the drawing. Color signals of red, green, and blue are supplied to the image output section 3 located in the lower portion of the base machine 1.

In the image output section 3, a signal processor section 33 converts the red, green and blue signals into coloring material signals of yellow, magenta, cyan, and black, performs shading correction processing, and the like. The processed signals are applied to recording sections 34Y, 34M, 34C, and 34K for those coloring materials.

Copy paper (not shown) as fed from the upper or lower copy paper feed tray 31a or 31b is transferred into the base machine by a feed roller 35a or 35b, and a pair of transfer rollers 36, and is transferred toward the yellow record section 34Y. In the yellow record section 34Y, an ink donnor film 40 from a feed roll 39 and the copy paper fed from the tray 31a or 31b are nipped between a thermal head 37 and a platen roller 38. Under this condition, the thermal head 37 is driven by the yellow coloring material signal, so that ink of the ink donnor film 40 is transferred onto the copy paper to form a yellow image. After the yellow image is transferred onto the copy paper, those are separated from each other. The separated copy paper bearing the yellow image thereon is transferred to the magneta record section 34M, while the ink donnor film 40 is taken up by a take-up roll 41. The structure and operation of each of the magenta, cyan, and black record sections 34M, 34C, and 34K resembles that of the yellow recording section 34Y as already mentioned, and hence no further description will be given.

In the magenta record section 34M, a process similar to that as mentioned above is executed, to superimpose a magenta image on the yellow image. In the subsequent recording sections, i.e., the cyan recording section 34C and the black recording section 34K, a cyan image and a black image are successviely layered on the previously formed images to form a 4-pass full color image. In this case, the transfer of the process color images in the recording sections 34Y, 34M, 34C, and 34K are carried out in synchronism with the scanning of the document in the document scan section 2. It is noted, however, that the copy paper passes the recording sections 34Y, 34M, 34C, and 34K at different times. To cope with this, in the signal processor section 33, coloring material signals of magenta, cyan, and black are supplied at corresponding different times, viz., with the delays amounting to the distances among the record sections.

The copy paper onto which the full color image has been transferred is discharged into the discharge tray 32 by means of transfer roller pairs 42 and 43. A power source section 44 feeds an operating power to the related portions, and copy paper sensors S1 to S5 sense the travel of the copy paper. The recording sections, and the rollers are driven by recording section motors 45.

The image reading device 5 will be described in detail with reference to FIGS. 4(a) and 4(b).

The image reading device 5, as already stated, includes the document transfer section 6 and the imaging optical section 7. As shown in detail in FIG. 5, the image reading device is made up of a pair of transfer rollers 68 including a drive roller 68a and a pinch roller 68b, a platen glass 69, a platen roller 70 to be in press-contact with the platen glass 69, and a pair of transfer rollers 71 including a drive roller 71a and a pinch roller 71b. The transfer roller 68 is located closer to the input or insert-side of the image reading device. The transfer roller 71 is located closer to the output or discharge-side of the device. A nip pressure of the platen roller 71 is set to be relatively high in order to read an image on a document reliability in the platen glass portion.

Where the nip pressure is high and a thin and small document is transferred, the platen roller 70 will be directly pressed against the platen glass 69 outside the area of the document. If the platen roller 70 is made of resilient material, such as rubber, friction between the platen roller 70 and the platen glass 69 will be large and will cause problems. For example, the platen roller 71 may be abraded and suffer a reduced lifetime. Rubber of the platen roller 70 may stick to and contaminate the platen glass 69, making the resultant image unclear. Further, large torque is required for driving the platen roller 70. To avoid this, the instant embodiment uses a metal platen roller 70 comprising an aluminum rod to which a white bake coating is applied. The portion where the roller 70 is rotatably coupled with the main body by bearings is an SUS bar.

the pinch roller 68b is rotatably supported at a first end 73a of a first arm 73 having an "L" shape in cross section, and is swingable about a shaft 72. The platen roller 70 and the discharge-side pinch roller 71b are swingably mounted at the first ends 75a and 76a of second and third arms 75 and 76, which are also L-shape, and are swingable about a shaft 74 in the opposite directions. The second ends 73b, 75b, and 76b of the first to third arms 73, 75, and 76 are in press contact with cams 77a to 77c with predetermined profiles.

Figure 6:
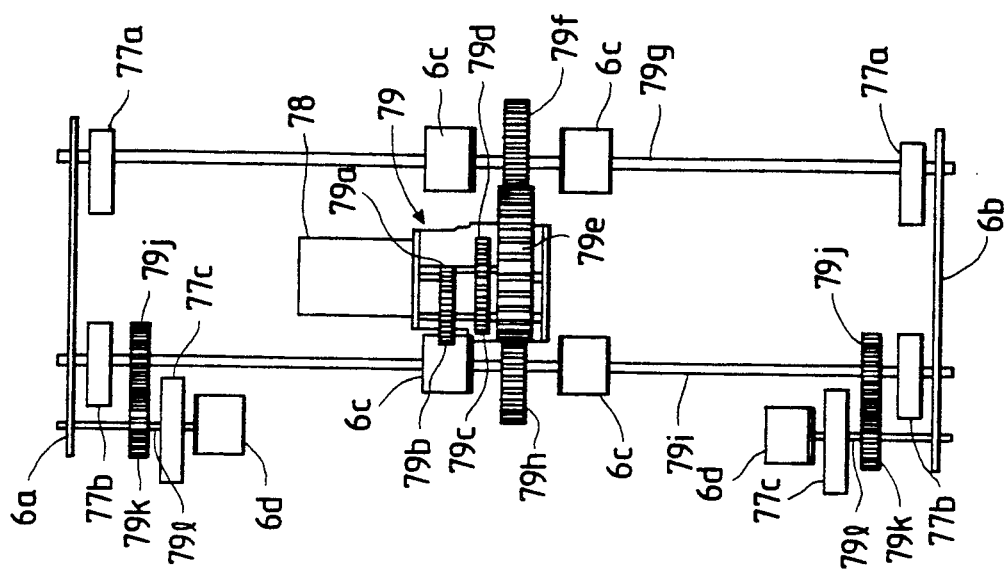
FIG. 6 is a plan view showing a cam drive system of the image reading device.

A rotating force of a cam motor 78, as shown in FIG. 6, is transmitted by a power transmission unit 79 to the cams 77a to 77c. The cams turn at the same angles in synchronism with one another. The rotating force of the cam motor 78 is transferred through a train of gears 79a to 79d to a gear 79e. The rotating force of the gear 79e is transferred through a gear 79f and a shaft 79g to the first cam 77a and is also transferred through a gear 79h and a shift 79i to the second cam 77b, and further to the third cam 77c through gears 79j and 79k, and shaft 79l. The shafts and the gears are rotatably supported by frames 6a and 6b, and brackets 6c and 6d provided in the upside of the document transfer section.

Figure 5:
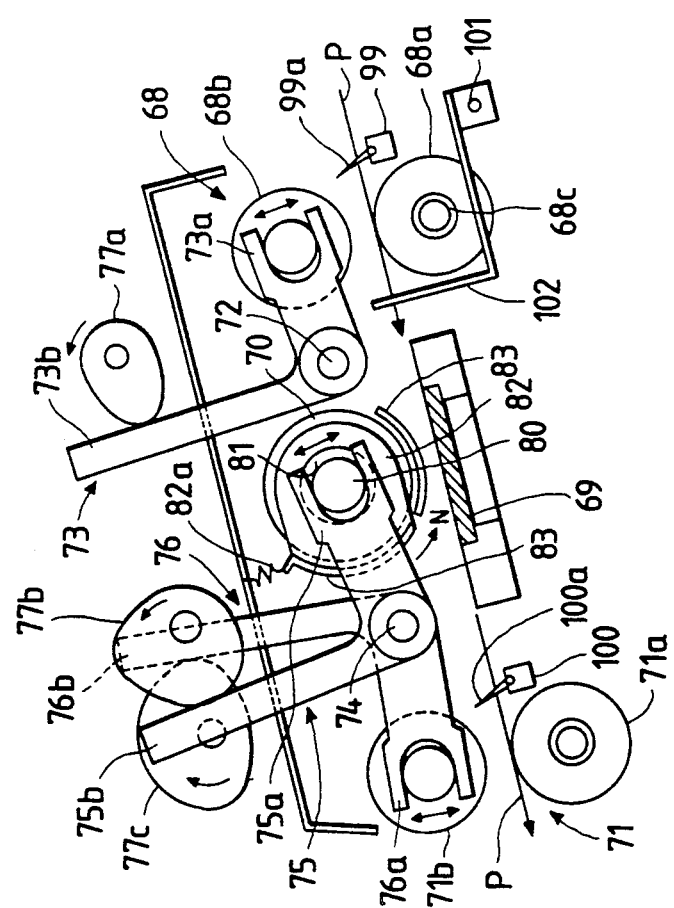
FIG. 5 is a sectional view showing a key portion of the image reading device.

When the cam motor turns clockwise as viewed in FIG. 5, the first and second cams 77a and 77b turn counterclockwise, while the third cam 77c turns clockwise. With the synchronized turning of the cams 77a to 77c, the pinch roller 68b, platen roller 70, and the pinch roller 71b move up and down in the direction of arrows.

FIGS. 3(a) to 3(c) are graphs showing relationships between the height of the bottoms of the pinch rollers 68b, 70, and 71b as measured from the platen surface, i.e., a plane flush with the surface of the platen glass 69, when no document is present, with respect to rotating angles of the cams 77a to 77c. As shown, when the document is absent, the insert-side pinch roller 68b is in contact with the platen surface in the range of 80 to 255 degrees of cam angle. The platen roller 70 is in contact with the platen glass 69 in the range of 160 to 260 degrees. The exit-side pinch roller 71b comes in contact with the platen surface in the range from 245 to 275 degrees.

A correction plate hold bracket 82 is coupled with a shaft 80 of the platen roller 70, with a unidirectional clutch 81 interposing therebetween. A shading correction plate 83, which is semicircle in cross section, is mounted on the bracket 82. The correction plate 83 is a reference white color paper with a uniform reflecting characteristic.

The correction plate serves as a reference white color plate of uniform reflecting characteristic. The unidirectional clutch 81 is directed such that when the platen roller 70 turns in the arrowhead direction N, viz., in the direction opposite to the document transfer direction, the correction plate hold bracket 82 turns together with the platen roller. The bracket 82 is biased by a spring 82a to turn in the direction that is the forward turning direction of the platen roller 70. Also in that direction, the bracket 82 separates from the platen glass 69.

Pulleys 91 and 92, as shown in FIG. 4 (a) and 4(b), are provided at the ends of the shafts of the drive rollers 68a and 71a, respectively. The rotating force of the transfer motor 93 is transferred to the drive roller 68a and 71a, through a motor pulley 94, belt 95, large-diameter pulley 96, small diameter pulley 97 rotating together with the large diameter pulley 96, and a belt 98. A magnetic clutch 68c is provided between the insert-side drive roller 68a and the pulley 91. The rotating force of the exit-side drive roller 71a is transferred to the platen roller 70, through a pulley and a belt (both not shown).

A sensor 99 for sensing a document as shown in FIG. 5, is disposed at the inlet of the roller pair 68 on the document transfer path. Another sensor 100 for sensing the document as discharged is disposed at the input of the roller pair 71. A gate 102 is disposed near the output of the transfer roller pair 68. When driven by a gate solenoid (not shown), the gate 102 is swung about a shaft 101, to extend into the document transfer path P and to retract therefrom. In this instance, the gate solenoid is of the latch type. In response to the application of a negative pulse, the solenoid places the gate 102 in the projected state. In response to a positive pulse, the gate 102 is retracted.

Three exposure lamps 111R, 111G, and 111B, as shown in FIG. 4(b), are disposed under the platen glass 69. Those lamps illuminate a document, through the platen glass 69. The reflected light from the document enters an imaging optical section including mirrors, lenses, image sensor, etc., through the platen glass 69 again.

Light from the document transfer section 6 is reflected at mirrors 112a and 112b and is imaged on the image sensor 114, through a lens 113. The image sensor is disposed in the bottom of the optical section 7. The image sensor converts the received optical image signals into corresponding electrical signals. The image sensor 114 has the same specification as that of the image sensor 25 used in the image reading device 5.

An operation of the copying system thus arranged will be described.

Let us consider a case where a normal document, i.e. a thin and small original of A3 size or less, is copied.

In the normal document copy mode, the insertion tray 61 of the image reading device 5 is raised as indicated by a two-dot chain line. Accordingly, an image signal derived from the image reading section 2 disposed on the base machine 1 is valid.

A document is put on the platen glass 21 as provided on the top surface of the base machine 1, and the platen cover 4 is closed. Because the tray 61 has been raised, the insertion tray 61 will not interrupt the opening and closing of the platen cover 4. A start button as provided on an operation panel of the base machine 1 is pushed. Upon the turn-on of the start button, the document scan section A of the image read section 2 as installed on the base machine 1 is moved. Through the movement of the image reading section 2, an image on the document is read, and converted into image signals. The image output section 3 forms and image using the image signals. A copy paper with a copied image thereon is discharged through the discharge tray 32.

In the normal copy paper size copy mode, the support bar 66 may be bent and the discharge tray 64 folded, so that the discharge tray 64 will not occupy a large space and not interfere with the copying work.

Copying of large documents will be described and, in the description to follow, an original document, called a design board of 4 mm thick and A2 size is assumed to be used.

Figure 8:
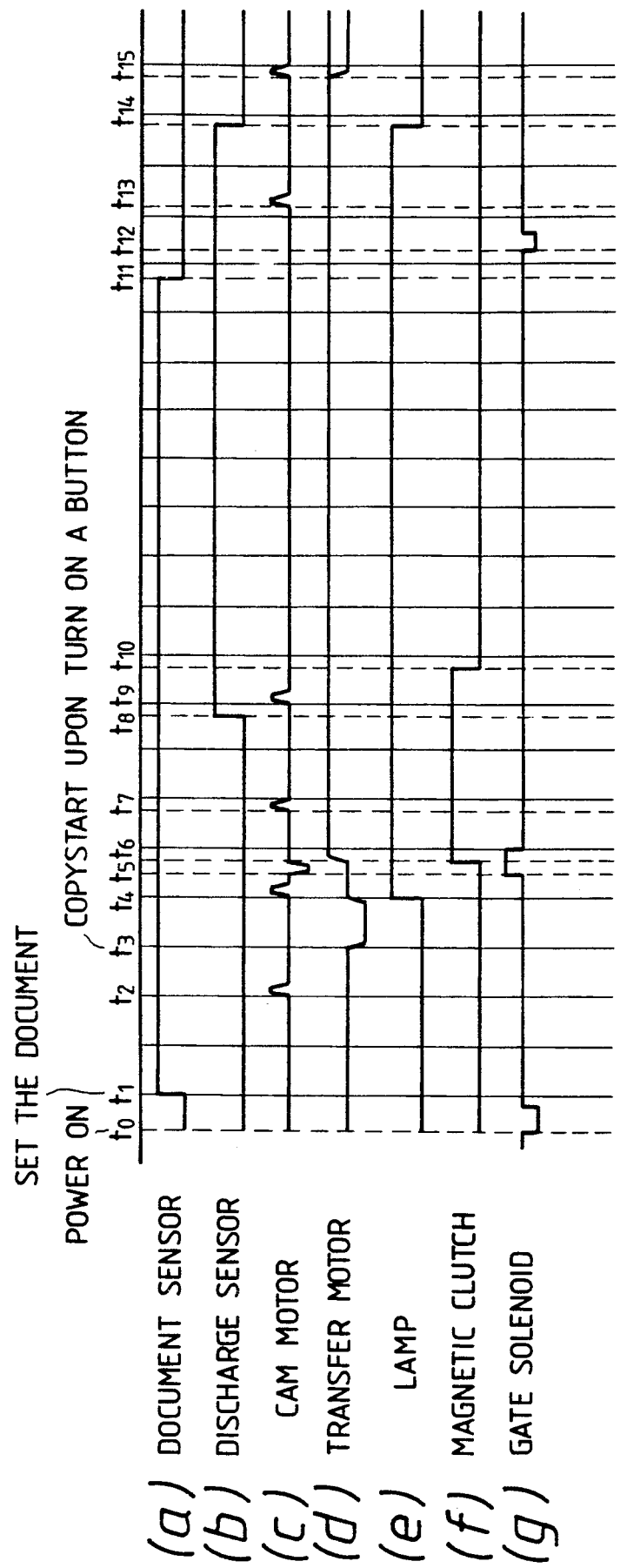
FIG. 8 is a timing chart showing an operation of the image reading device.

As shown in FIG. 8(g), at time point t0 of power on, a negative pulse is applied to a gate solenoid (not shown) to drive the gate 102. In response to this pulse, the gate 102 is caused to project into the document transfer path P.

In this case, as shown in FIG. 2, the insertion tray 61 of the image reading device 5 is noted to be above the platen cover 4 of the base machine 1. Under this condition, a power switch is turned on, and then an image signal derived from the image reading device 5 is valid. In this case, since a free end portion 61b of the tray 61 covers a side edge portion 4a of the platen cover 4, the platen cover 4 cannot be swung. Accordingly, when the image signal from the image reading device 5 is selected, a copying operation using the platen glass 21 may not be performed.

As shown in FIG. 8(g), at time t0 of power on, a negative pulse is applied to a gate solenoid (not shown) to drive the gate 102. The gate 102 is projected across the original transfer path P.

Figure 9:
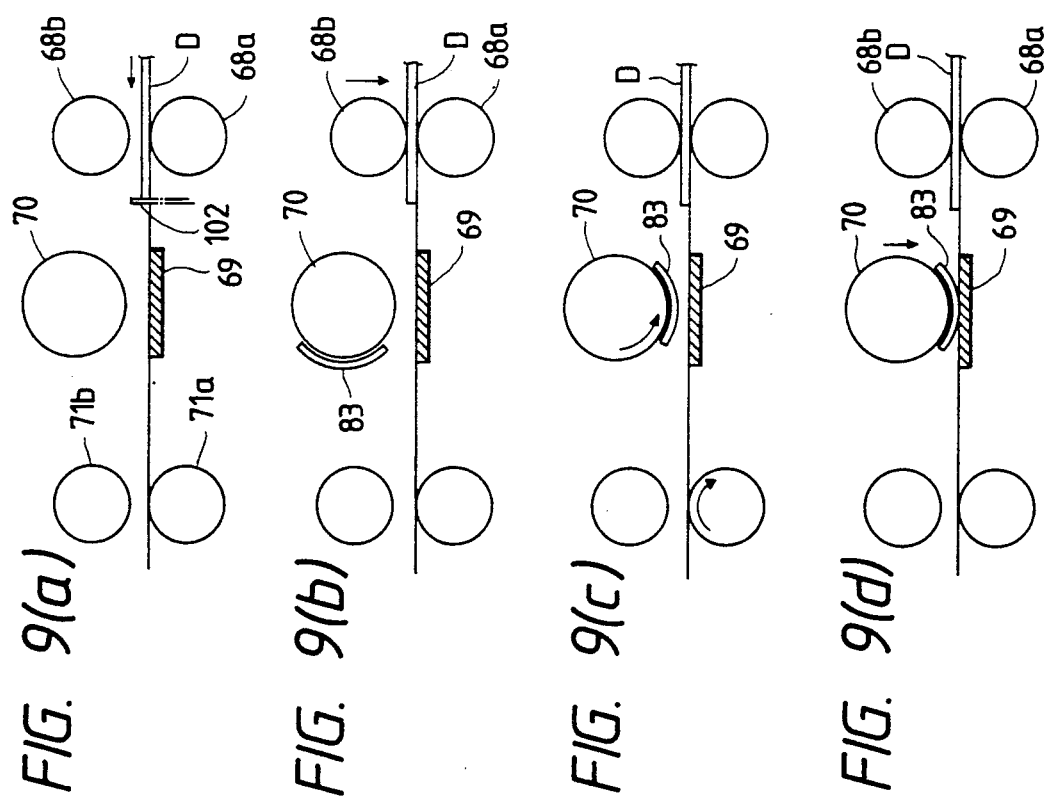
FIG. 9(a) through (i) are diagrams useful in explaining the raising and lowering of the rollers when a document is transferred.
Figure 10:
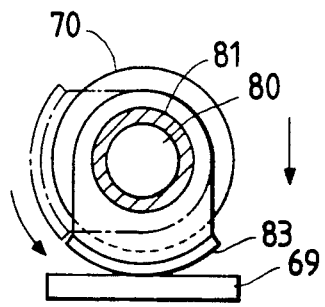
FIG. 10 is a diagram useful in explaining an operation of a shading correction plate.

A document D may be inserted into the image reading device along the insertion tray 61 (see FIG. 9(a)). In an initial state, the angles of cams 77a to 77c are 0 degree. Under this condition, as seen from FIGS. 7(a), 7(b) and 7(c), all three rollers 68b, 70, and 71b are lifted approximately 6 mm from the platen surface. The lead edge of the 4 mm thick document passes between the drive roller 68a and the pinch roller 68b of the insert-side transfer roller pair 68, pushes the actuator 99a of the sensor 99, and then hits the gate 102 to come to stop. The leading edge of the document is sensed by the sensor 99 (time point tl in FIG. 8(a)), At a predetermined time after (time point t2 in FIG. 8(c)) the sensing of the document leading edge, the cam motor is driven and starts to turn so that the first and second cams 77a and 77b are driven counterclockwise in FIG. 5, and the third cam 77c is turned clockwise. As shown in FIG. 7(a), the pinch roller 68b starts to descend according to the profile of the first cam 77a. It descends up to the height of 4 mm, and hits the document. The document is nipped between the pinch roller 68b and the drive roller 68a (FIG. 9(b)).

The cam motor further continues to rotate. Since the lowest position of the pinch roller 68b is limited by the thickness of the document, however, the first arm 73 supporting the pinch roller 68b separates from the cam 77a. The cams 77a to 77c turns by 90 degree from a reference angle, and then the cam motor stops. The cam motor used in this instance is a stepping motor which turns by an angle proportional to the number of drive pulses supplied. A waveform shown in FIG. 8(c) shows an envelope of the drive pulse signal. In the waveform, the up direction indicates the forward drive; the down direction, a reverse drive; the width of the waveform corresponds to the number of drive pulses.

The start button installed on the operation panel of the base machine 1, for example, is pushed (time point t3). Then, as shown in FIG. 8(d), the transfer motor turns in the reverse direction to the document transfer direction. At this time, the magnetic clutch 68c coupled the drive roller 68a remains turned off, as shown in FIG. 8(f). Accordingly, the drive roller 68a is not turned and no force is applied to the document. The transfer motor is also a stepping motor and the waveform shown in FIG. 8(d) has the same meanings as those of that of FIG. 8(c).

With the reverse turn of the transfer motor, the platen roller 70 also turns in reverse. This turn is transferred through the unidirectional clutch 81 to the correction plate hold bracket 82 which in turn turns in the same direction (see FIG. 9(c)). With the turning of the bracket, the shading correction plate 83 mounted on the bracket 82 moves to under the platen roller 70, i.e., correction position, as indicated by a two-dot chain line in FIG. 5. When the shading correction plate 83 reaches a place between the platen roller 70 and the platen glass 69, the reverse turn of the transfer motor is stopped (time point t4). Afterwards, the cam motor is forwardly driven to turn the cams 77a to 77c from the reference angle to 180 degrees. At this cam angle, as seen from FIG. 7(b), the platen roller 70 is allowed to descend up to the lowest position. Accordingly, the shading correction plate 83 is put into press contact with the surface of the platen glass 69.

The exposure lamps 111R, 111G, and 111B are lit, as shown in FIG. 8(e). At this time, the second expose lamps 22R, 22G, and 22B in the image reading section 2 of the base machine 1 are not lit. Under this condition, the lamps 111R, 111G, and 111B illuminate the shading correction plate 83. The reflected light passes through the platen glass 69, mirrors 112a and 112b, and the lens 113 and forms an image by the image sensor 114. An image signal from the image sensor 114 is transferred to the signal processor portion 33 where is subjected to the preprocessing for the shading correction.

The shading correction plate 83 is the reference white color plate. Levels of the image signals must be uniform over the entire width of the image sensor 114. Hence, if the signal levels are not uniform, the level of light emitted from the lamps 111R, 111G and 111B are considered not to be uniform as viewed in the length direction of the lamps. Therefore, the shading correction of an output image can be made in a manner that the levels of the image signals read from the shading correction plate 83 are stored as correction data, and the levels of signals as actually read from a document are corrected by using the correction data.

At the completion of the pre-processing for the shading correction (at time point t5), the cam motor, as shown in FIG. 8(c), is then reversely turned, so that the cams 77a to 77c are returned to a position of 90 degrees as counted from the reference angle. Accordingly, the platen roller 70 separates from the surface of the platen glass 69, and rises to the highest position again. At this time, the insert side drive roller 68a is left in press contact with the document (see FIG. 9(e)), and as shown in FIG. 8(g), a positive pulse is applied to the gate solenoid (not shown) so that the gate 102 retracts from the document transfer path P.

When the lifting of the platen roller 70 ends (time point t6), as shown in FIG. 8(d), the transfer motor is forwardly driven, and the magnetic clutch 68c is coupled with the insert side roller pair 68. Accordingly, the drive roller 68a starts to turn in the forward direction, and the document is transferred beyond the position of the gate 102, while being nipped between the drive roller 68a and the pinch roller 68b (see FIG. 9(f)). At this time, the platen roller 70 also turns in the forward direction. Then, the shading plate 83 pulled by the spring 82a to swing to the right to return to the document position.

The leading edge of the document reaches a position between the platen roller 70 placed at the raised position and the platen glass 69, at time point t7. At this time, the cam motor turns in the forward direction and stops after turning 180 degree. The platen roller 70 then descends according to the profile of the second cam 77b, and comes in contact with the document at the height of 4mm, to nip the document between the platen roller 70 and the platen glass 69. The document is transferred downstream by means of the platen roller 70 and the insert-side transfer roller pair 68, while the document remains in press contact with the platen glass 69 by the force of the platen roller 70 (see FIG. 9(g).

At this time, an image on the document is illuminated by the lamps 111R, 111G, a 111B, with the platen glass 69 being interposed therebetween. The reflected light from the document is imaged on the image sensor 114, and the image reading from the document progresses sequentially. The image signal from the image sensor is supplied to the signal processor 33 of the base machine 1 where the processing of the shading correction, for example, is executed. A copy image is then formed as in the copying of a normal document.

The document D is further advanced, and the leading edge of the document hits the actuator 100a of the exit sensor 100, and pushes it down. When the sensor 100 is turned on as shown in FIG. 8(b) (time t8), the cam motor starts to operate again after a predetermined time (time point t9). The motor turns up to 250 degree, and stops. The turning of the cam motor causes the discharge-side pinch roller 71b to descend to the height of 4mm according to the profile of the third cam 77c, and to come into contact with the document. Finally, the document is nipped between the pinch roller 71b and the drive roller 71a. In this way, the reading of the document progresses while the document is nipped by the insert-side transfer roller pair 68, platen roller 70, and the discharge-side transfer roller pair 71 (see FIG. 9(h)). After a preset delay time from time point t9 (time point t10), the magnetic clutch 68c of the roller pair 68 is turned off. Subsequently, the document is transferred by the platen roller 70 and the roller pair 71, and the insert-side transfer roller pair 68 is in a free rotation.

With further progress of the transfer of the document D, the sensor 99 senses the trailing edge of the document, and is turned off as shown in FIG. 8(a) (time point t11). Upon detection of the trailing edge, a negative pulse is applied to the gate solenoid (not shown) after a preset time (time point t12), and the gate 102 is extended to again interrupt the document transfer path P. After a preset time (time point t13) from the sensing of the trailing edge of the document, the cam motor is turned forwardly 265 degree, and it comes to stop. This rotation pulls up the lowest position of the pinch roller 68b and the platen roller 70, according to the profiles of the first and second cams 77a and 77b, and the platen roller 70 slightly separates from the platen surface (see FIG. 9(i)).

As a result, the image reading device is free from the following problem. When the trailing edge of the 4 mm-thick document exists from the platen roller 70, the metal platen roller 70 drop on the platen glass 69 to produce a noisy sound or possibly breaking the platen glass 69.

The document D is further transferred, and the trailing edge of the document is sensed by the exit sensor 100 (time point t14). At this time, as shown in FIG. 8(e), the exposure lamps 111R, 111G, and 111B are turned off, and after a peset time (t15), the cam motor is forwardly driven, and turns to the 0 degree position, and comes to stop. As the result of the turning of the motor, three rollers 68b, 70, and 71b are all put back to the position farthest from the platen surface 69, according to the profiles of the first to third cams 77a to 77c.

After it is read, the document D is discharged and advances to the discharge tray 64 by means of the discharge-side roller pair 71. In a case of the thick and large document, such as a design board which is relatively heavy, an excessive force will not be applied to the document per se and the original transport section 6 because the document is supported by the tray 64.

When the trailing edge of the document exists the discharge-side transfer roller pair 71, the document advances along the exit tray 64 by its weight. The transfer operation of a thin document is substantially the same as that of the thick document, except the rollers 68b, 70, and 71b descend to a height corresponding to the thickness of the thin document for. In the case of the thin document, the support bar is bent and the discharge tray 64 is folded. The discharged document is finally stored in the discharge tray 67 installed on the side wall of the imaging optical system 7 after being bent by its own weight.

The document transfer section 6 is capable of transferring a document of A1 size. An image in only a central portion on the document of A1 size can be selected and copied, and the description to follow elaborates on how an image within a specified area on a document is copied on a specified area on a copy paper as it is transferred in the base machine.

Figure 11A:
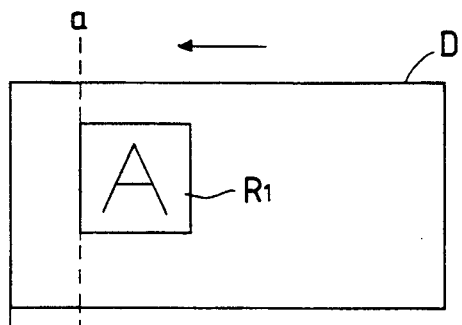
FIG. 11(a) through 11(e) are for explaining how an image within a specified area on a large document is reduced and copied on a specified area on a copy paper.
Figure 11B:
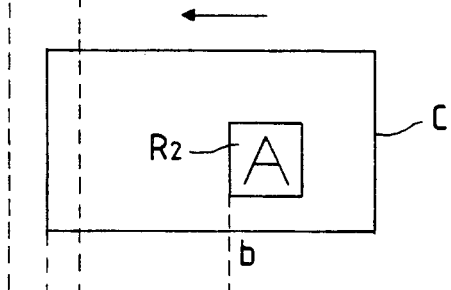
Figure 11C:
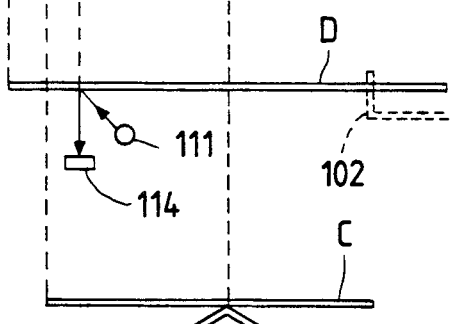
Figure 11D:
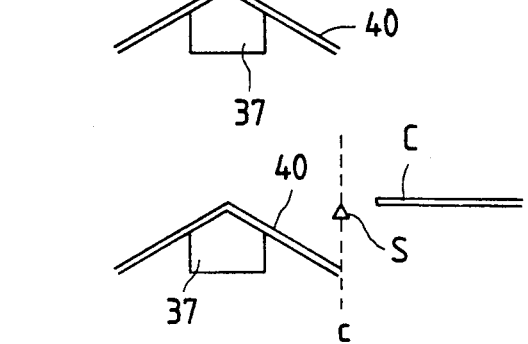

In the description, an image within an area R1 on a document D (FIG. 11(a)) will be reduced and copied on an area R2 on a copy paper C (FIG. 11(b)). In the figure, the horizontal direction coincides with the main scan direction when the image sensor 114 scans, and the vertical direction coincides with the vertical scan direction. Point "a" indicates a read position by the image sensor 114; point "b", a position of the thermal head 37 as a record head; point "c", a position of the paper sensor S disposed immediately before the thermal head 37.

Image reading and image formation start from an instant that the leading edge of an effective area of the document D, i.e., the area R1, is positioned at point "a", and the leading edge of the area R2 of the copy paper C is positioned at point "b".

Figure 11E:
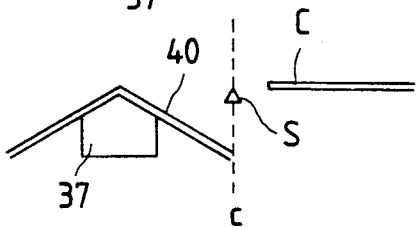
Figure 12:
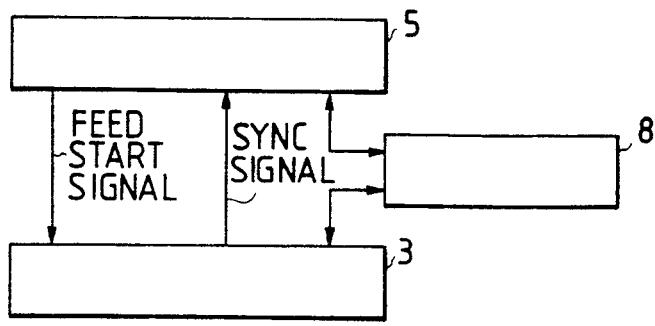
FIG. 12 is a block diagram showing a model of signal transfers between an image reading section and an image outputting section.
Figure 13:
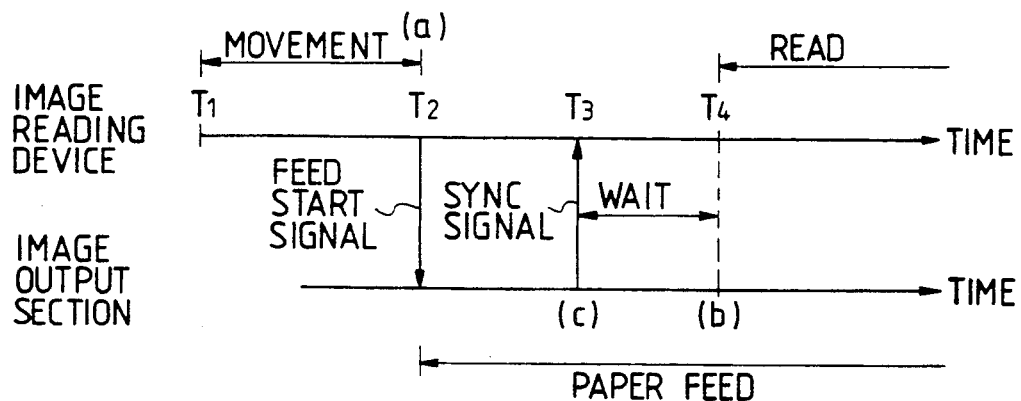
FIG. 13 is a sequence diagram showing the relative synchronization of the operation of the image reading section and the operation of the image outputting section.

The operation of a control circuit for making such a copy is illustrated in FIG. 13, wherein points (a), (b), and (c) corresponding to points "a", "b", and "c" shown in FIGS. 11(a), 11(b) and 11(e) respectively.

It is assumed that the leading edge of the document D is positioned at the location of the gate 102 (FIG. 11 (c)). When copying is started, the transfer motor 93 of the image reading device 5 responds to an instruction from the controller 8 to turn from time point T1, and the document D starts to move in the direction of arrow, as shown in FIG. 11(a) and (b). No image reading is initially performed.

When the leading edge of the area R1 of the document D reaches point "a" (time point T2), the document D comes to stop. At the same time, the image read device 5 sends a paper feed start signal to the image-output section 3. In response to the start signal, the image output section 3 starts to convey a copy paper C at a fixed speed, and the leading edge of the copy paper passes point "c" (see FIGS. 11 (e)) at time point T3. At this time, the image output section 3 sends a sync signal to the image reading device 5. The sync signal indicates to the image reading device 5 that the image output device 3 is ready for image recording operation.

After the paper C passses point "c", the movement of the paper still continues. When the leading edge of the area R2 reaches point "b" (time point T4), the image reading device 5 starts to operate, and reads an image from area R1 on the document. To be more specific, the exposure lamp 111 illuminates the document, and the image sensor 114 reads the image within the area R1 beginning from the leading edge of that area (FIG. 11(c)). In FIG. 11, the respective exposure lamps 111R, 111G, and 111B are designated generally by reference numeral 111. The overall optical system illustrated is simplified.

In this case, a read speed is changed depending on a copy magnification. The transfer speed of the copy paper C in the image output section 3 is constant in order to stabilize the copy characteristic. When the magnification is "α", a document transfer speed V is: V=Vo/α where Vo is a document transfer speed when the magnification is 100%. In a reduction mode of 50%, the document transfer speed is doubled. With the doubled transfer speed, the document is halved in the document transfer speed, viz., the vertical scan direction. The reduction in the main scan direction is realized by applying the interpolating process or thin-out process to the signals as derived from the image sensor 114.

In this way, the image within the area R1 on the document D as shown in FIG. 11(a) may be reduced and copied on the area R2 on the copy paper C as shown in FIG. 11(b).

Figure 14:
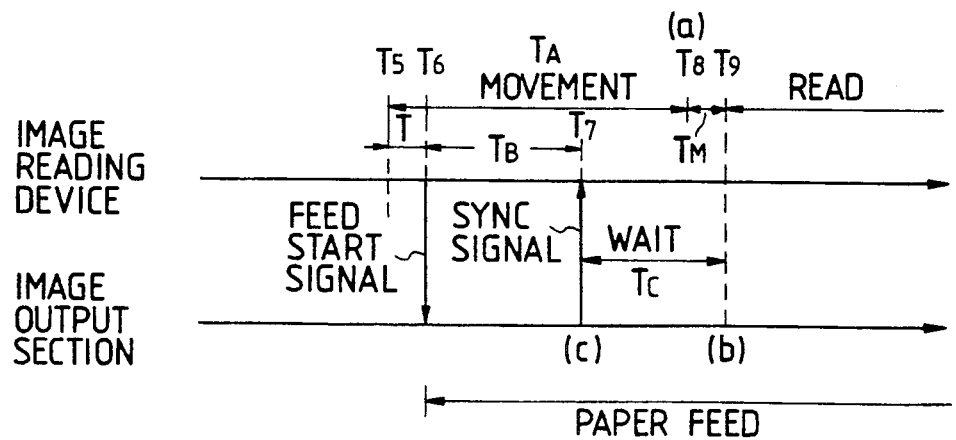
FIG. 14 is a sequence diagram showing the relative synchronization of the operation of the image reading section and the operation of the image outputting section under the condition of enhanced copy efficiency.
Figure 15:
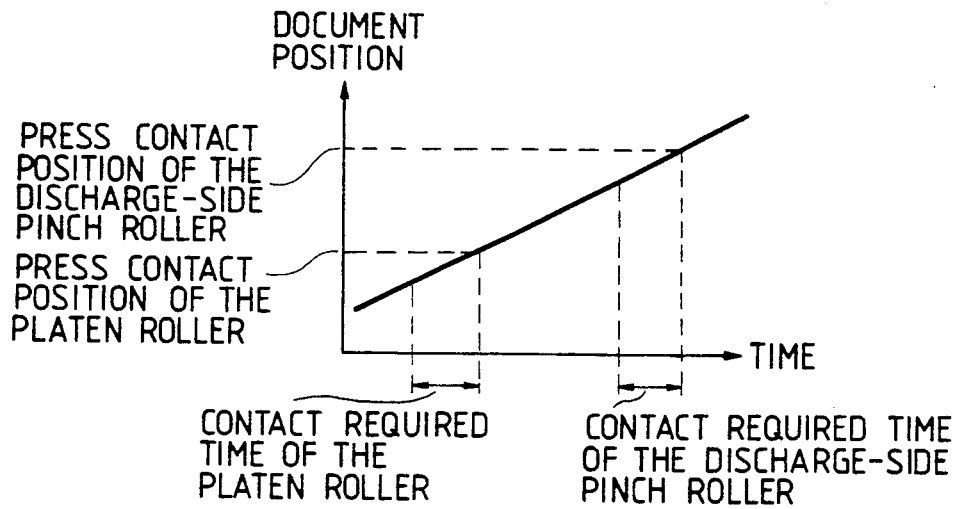
FIG. 15 is a graph showing required contact times of the rollers.

Another method of controlling the image reading device 5 and the image output section 3 is illustrated in FIG. 14.

In this instance, time T is obtained by using the following equation $$T=(TA+TM)-(TB+TC)$$

where TA=T8−T5, and indicates the time taken from an instant that the document D starts to move in the image reading device 5 until the leading edge of the area R1 on the document reaches point "a", TB=T7−T6 and indicates the time taken from an instant that a copy paper starts in the image output section 3 until the leading edge of the copy paper passes point "c", TC=T9−T7 and indicates the time taken for the leading edge of the copy paper to move from point "c" to point "a", and TM is a margin.

In the image output section 3, the feeding of the copy paper starts at time point T6 after the time T since the document starts to move. With this, the moving operation of the document D in the image reading device 3 and the paper feed operation in the image output section 3 can be concurrently performed to reduce the time required for copying operation.

In reading the document D by the image reading device 5, the insert-side pinch roller 68b, platen roller 70, and discharge-side pinch roller 71b sequentially press the document D for the transfer of the document. To reduce and copy the image within the area R1 on the document D (FIG. 11(a)) on the area R2 on the copy paper C (FIG. 11 (b)), only the pinch roller 68b first presses the document D. At time point "a" where the leading edge of the area R1 on the document D reaches point "a", the platen roller 70 comes in press contact with the document D, and the reading of the document image starts. The platen roller 70 presses the rear side of the document D after the time elapses from the start of descending of the platen roller.

As already described, the transfer speed of the document D is not fixed, but may be changed depending on the selected degree of magnification. Therefore, if press contact of the platen roller 70 and the document is to be made at a position separated from the leading edge of the document D by a fixed distance, e.g., 10 mm, it is necessary to start the descending of the platen roller 70 at positions that are different for different magnifications.

To this end, control is set to obtain a time when a position on the document to be in contact with the platen roller, passes the position of the platen roller 70, and then starts the descent of the platen roller 70 prior to the time that the press contact starts (required contact time).

As seen from the foregoing description, with regard to the document transfer, a relationship between the document position and time can be uniquely obtained. Specifically, the relative timing of press contact the platen roller 70 and the discharge-side pinch roller 71b with the document can be set at the position distance 10 mm from the leading edge of the document.

Figure 16:
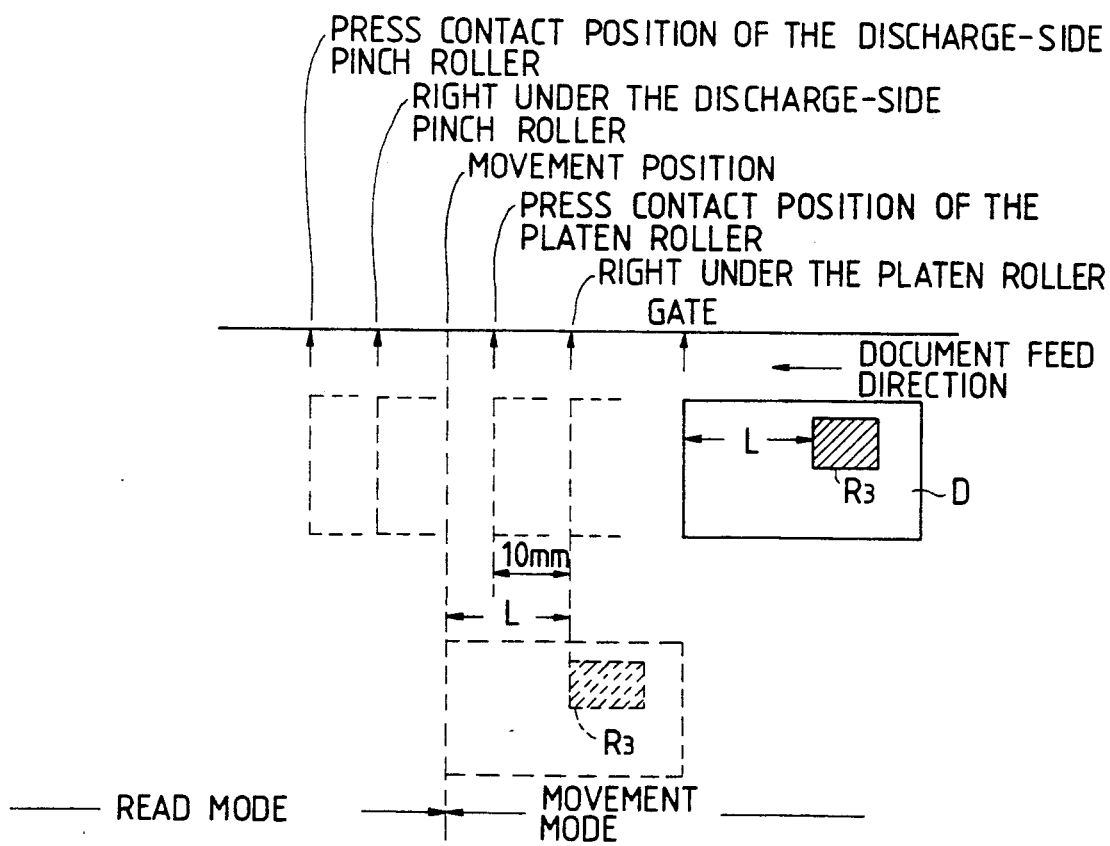
FIG. 16 is a diagram showing the relationships of a document to the rollers.

FIG. 16 shows how a document D is transferred while the leading edge of the document passes the following locations: the gate 102, just under the platen roller 70, the press contact position of the platen roller 70, just under the discharge-side pinch roller 71b, and the press contact position of the discharge-side pinch roller 71b.

In this instance, the leading edge of an effective area R3 on the document is located between the press contact position of the platen roller 70 and the place just under the discharge-side pinch roller 71b. The leading edge of this area is set at any of the positions downstream of just under the platen roller 70, which depends on a distance L between the leading edge of the document D and the leading edge of the effective area R3. In this instance, this position is referred to as "movement position". The document is transferred at a constant speed up to the movement position, without any reading operation. After the movement position, it is transferred at a speed as determined depending on a the selected level of magnification, while at the same the image on the document is read. The former is called "movement mode", and the latter "read mode".

Figure 17:
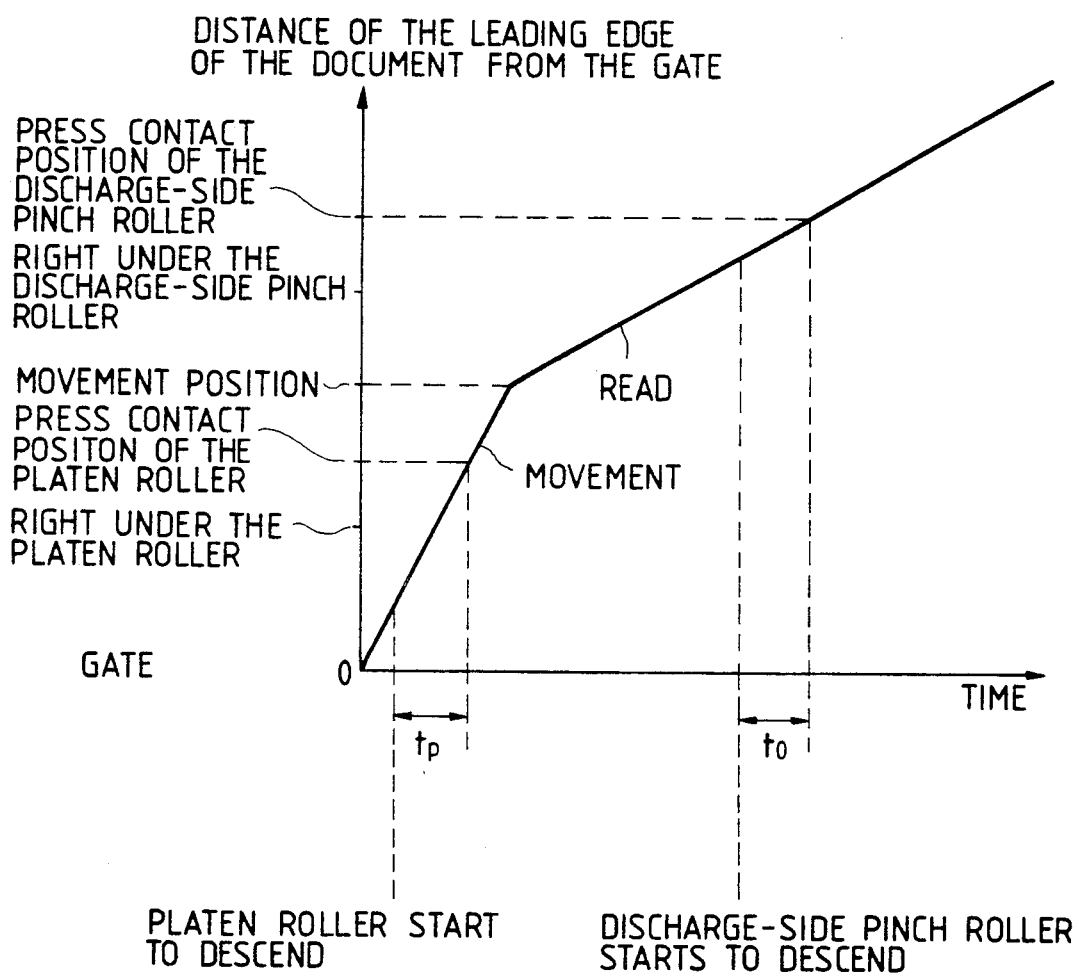
FIG. 17 is a graph showing the basic relationships between positions of the leading edge of a document with respect to time in a movement mode and a reading mode.

FIG. 17 is a graph showing a relationship between positions of the leading edge of the document D with respect to time in the movement mode and the read mode. As seen from the graph, if the contact required time tp of the platen roller, the contact required time to of the discharge-side pinch roller, and the transfer speed of the document are known, it is possible to determine the timings of start of the descend of the platen roller 70 and the discharge-side pinch roller 71b.

In the above description, only the image reading device 5 is taken into consideration; however, the operation progresses in connection with the operation of the image output section 3, and hence unlike the operation as illustrated in FIG. 17, the actual operation is more complicated.

As described with reference to FIGS. 11 to 14, in reading an image on a document, in order to synchronize the image reading section 5 and the image output section 3, the two modes, i.e., the movement mode and the read mode, are introduced into the document transfer operation, and a rest period, i.e., a sync wait time that the document transfer is stopped until the synchronization is set up, is provided between both the modes.

Figure 18:
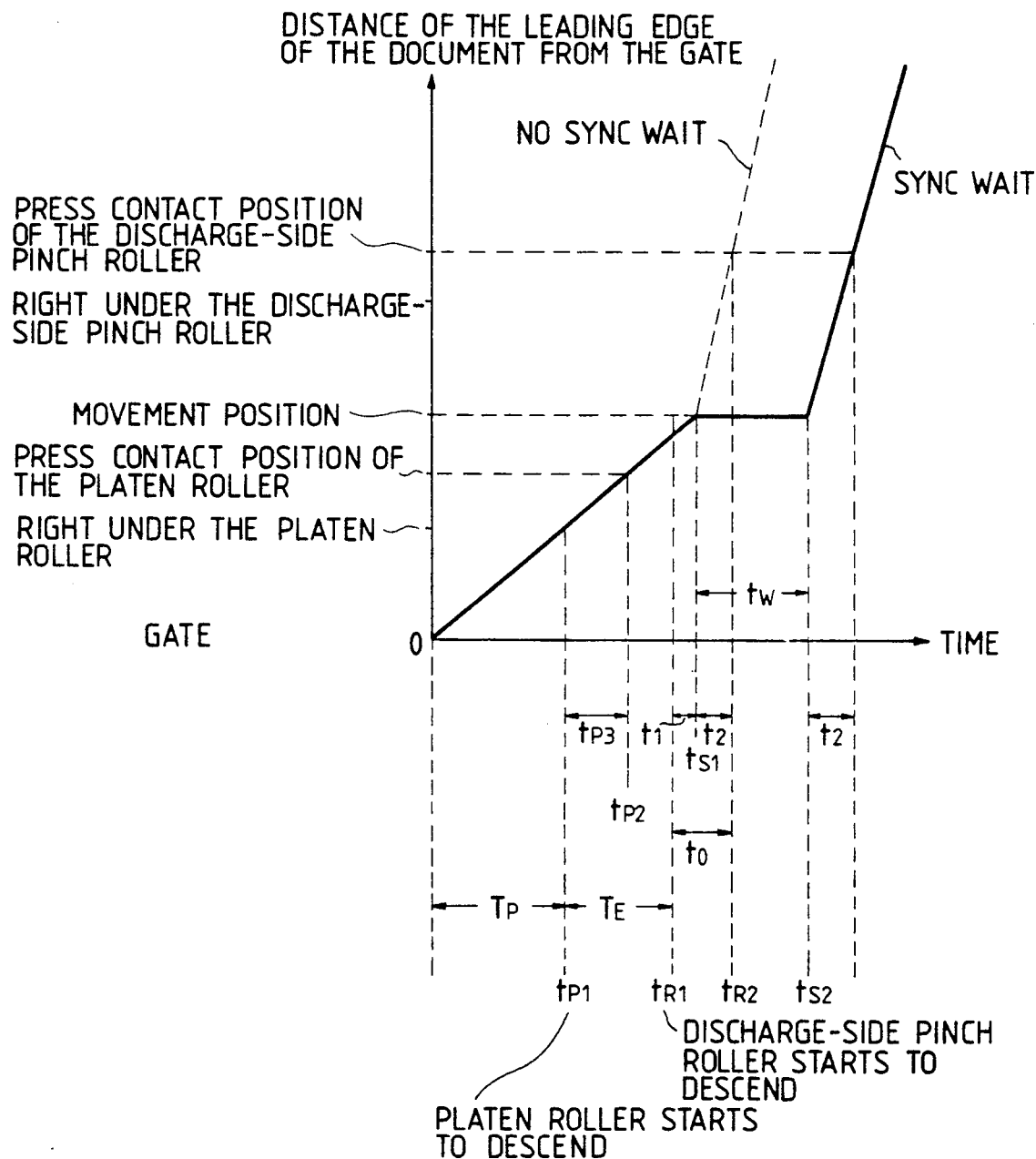
FIG. 18 is a graph showing the basic relationships between positions of the leading edge of a document with respect to time when a sync wait in the image reading section is taken into consideration.

FIG. 18 is a graph showing a relationship between the positions of the leading edge of the document and time where the movement position is between the press contact position of the platen roller and the position just under the discharge-side pinch roller, and in the read mode, the document is transferred at a high speed.

Upon the start of copying operation, the gate 102 is opened, and the document D is transferred at constant speed toward the platen roller 70. The transfer of the document D starts and time Tp elapses. At time point tp1, the cam motor 78 is driven and the platen roller starts to descend. The time point tp1 is equal to the result of subtracting the contact required time of the platen roller and the time point tp2 where the leading edge of the document D passes the press contact position of the platen roller. Accordingly, when the leading edge of the document D passes the press contact position of the platen roller, the platen roller 70 presses the document against the platen glass.

When the leading edge of the document D reaches the movement position, the transfer of the document D in the movement mode is stopped, while at the same time a paper feed start signal is transferred from the image reading device 5 to the image output section 3 (time point ts1). The copy paper C is then transferred at constant speed in the image output section 3.

When the paper C is transferred and reaches a preset position, the image output section 3 sends a sync signal toward the image reading device 5 (time ts2). Then, the image reading device 5 starts to operate in the read mode. The transfer of the document D starts, and an image on the document is read while the document is transferred at a speed that depends on the selected magnification. A period between time points ts1 and ts2 serves as a sync wait time Tw.

Theoretically, the sync wait time Tw must be set from the lapse of time after the paper feed starts. Actually, however, paper slippage is inevitable in the paper feed system, and the exact timing to the reception of the sync signal from the image output section 3 may not be known.

The image reading device 5 is designed with presumption of operation timings (indicated by broken lines) under the condition of no sync wait time, the press contact timings of the platen roller 70 and the discharge-side pinch roller 71b are obtained, and the cam motor 78 is driven on the basis of the press contact timings as obtained. The reason why such a presumption is used, is that the movement position is within the contact required time t0 of the discharge-side pinch roller, and if such a presumption is not used, the calculation is impossible.

Alternatively, the movement position may be located outside the time t0. In this approach, however, the related processing is complicated and the record position becomes inexact.

Actually, however, in the read mode the transfer of the document D does not restart until the sync signal from the image output section 3 is received. For this reason, the following disadvantages will possibly result.

In the operation shown in FIG. 18, the descending start timing tR1 of the discharge-side pinch roller 71b is located prior to the sync wait time Tw. At this time point, the discharge-side pinch roller 71b starts to descend, and when the leading edge of the document D reaches the movement position, the transfer of the document D comes to stop. Therefore, the discharge-side pinch roller 71b descends and could drop on the platen glass 69 before the document D arrives.

Accordingly, when the read mode is set up and the transfer of the document D starts again, the document D must push up the discharge-side pinch roller 71b and advance. This causes the document transfer load to become temporarily heavy, and the transfer speed vary. The variation of the transfer speed of the document leads to a variation of read density in the vertical scan. In turn, this can cause stripes on an image reproduced on the copy paper C. Further, the discharge-side pinch roller 71b directly hits the platen surface, and may damage the surface of the platen surface. To cope with this, in the instant embodiment, during the rest period of the document transfer, the drive of the cam motor 78 is stopped to prevent the pinch roller 71b from descending. The stop of the cam motor 78 remains stopped until the read mode is set up, and the transfer of the document starts again.

Figure 19:
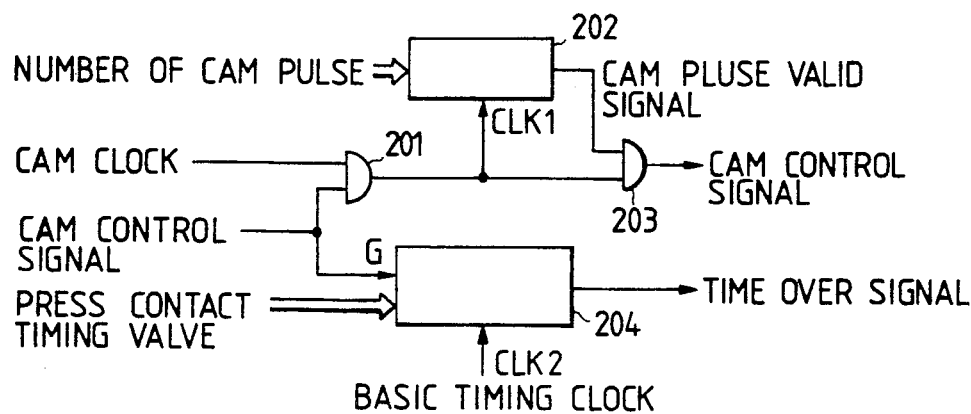
FIG. 19 is a block diagram showing a cam drive pulse generator for driving a cam motor.

An arrangement of a cam drive pulse generator to execute such processing and its operation will be described with reference to FIGS. 19 to 21. A cam clock signal that is regularly generated at fixed periods as shown in FIG. 21(a), together with a cam control signal as shown in FIG. 21(b), is applied to an AND gate 201. An output signal of the gate is applied to a clock terminal CLK1 of a cam pulse counter 202. The cam pulse counter 202 is provided for generating a cam pulse valid signal (see FIG. 21(c)) according to the number of cam pulses as set. The cam pulse valid signal, together with the output signal of the AND gate 201, is applied to an AND gate 203, which in turn generates a cam drive pulse (FIG. 21(d)) to drive the cam motor 78.

A roller lift sequence timer 204, which is driven by a basic timing clock signal supplied from a clock terminal CLK2, generates a time-over signal (FIG. 21(e)) after a fixed time, according to a press contact timing as set. When no cam control signal is applied to the gate terminal G of the timer 204, the timer will not progress.

An operation of the cam drive pulse generator will be described.

Figure 20:
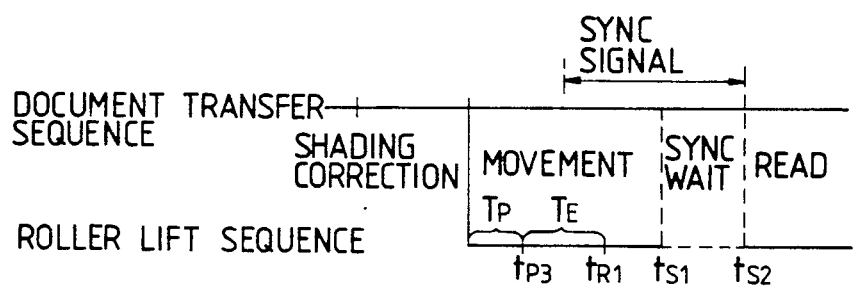
FIG. 20 shows a sequence diagram for explaining the document transfer operation and the raising and lowering operation of the rollers.
Figure 21:
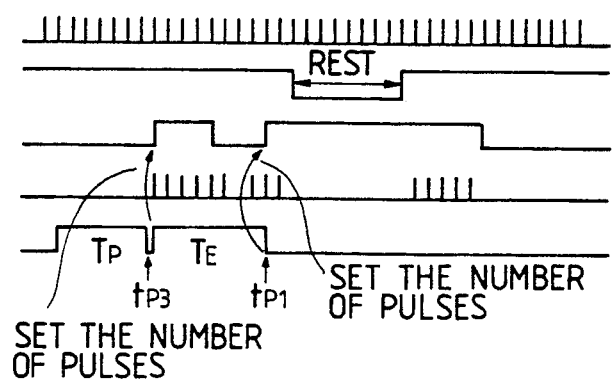
FIG. 21 shows a set waveforms useful in explaining the operation of FIG. 19.

FIG. 20 shows a document transfer sequence and a roller lifting sequence in the image reading device 5. After the shading correction ends, a roller press contact timing value corresponding to time Tp is set in the timer 204. At this time, the cam control signal is high in logic level (FIG. 21(b)), and then the timer 204 is driven by the basic timing clock signal so that the value in the timer 204 decrements at a fixed rate. After time Tp elapses, the timer 204 times out and the time over signal goes low. The time over signal sets the number of cam pulses for platen roller press contact in the cam pulse counter 202, at time point tp3. A timing value for the roller press contact, which corresponds to time TE, is set in the timer 204. At this time, the cam control signal is high in logic level. Accordingly, the cam pulse counter 202 is driven by a cam clock. A cam pulse valid signal goes high and remains high for a period amounting to the number of cam pulses as set. A cam drive pulse is outputted. Consequently, the cam motor 78 turns by a preset angle, and the platen roller 70 comes in press contact state.

After time TE elapses from time point tp3, the number of cam pulses to place the discharge-side pinch roller in a press contact state is set in the cam pulse counter 202 at time point tR1. At this time, the cam control signal is high, and accordingly as in the previous case, the cam pulse valid signal goes high and keeps its logic state for a period amounting to the number of cam pulses as set. And a cam drive pulse signal is outputted. Then, the cam motor 78 starts to turn, and the discharge-side pinch roller 71b starts to ascend. The sync wait period in FIG. 20 corresponds to the reset period in FIG. 21.

The leading edge of the document D reaches the movement position at time point ts1 (see FIG. 18), and the transfer of the document is stopped. At this time, the cam control signal goes low. Accordingly, the supply of the cam clock signal to the cam pulse counter stops, and the counter operation stops. The gate terminal of the roller lift sequence timer 204 also goes low, and the timer times out.

After time point ts1, control enters the sync wait period. After a fixed period from the receiving of a sync signal derived from the image output section 3, the image reading device 5 is placed to the read mode. The transfer of the document at a speed that depends on the selected magnification starts again, while at the same time the image reading operation starts, and the cam control signal goes high again. In turn, the cam pulse counter 202 starts its counting operation again, and the roller lift sequence timer 204 starts to operate again. As a consequence, the discharge-side pinch roller 71b descends and comes in press contact with the rear side of the document D after the leading edge of the document passes.

With such a control, the discharge-side pinch roller 71b will not drop and directly hits the platen surface immediately before the document reaches there to interrupt the document transfer or damage the platen surface.

Figure 22A:
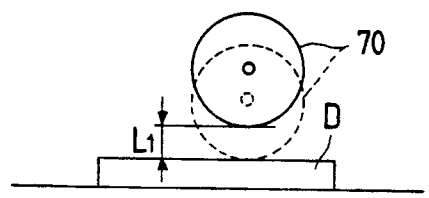
FIG. 22(a) and 22(b) are diagrams for explaining a relationship between the thickness of a document and the required contact time.
Figure 22B:
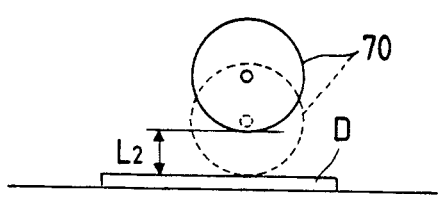

The description has been made on the assumption that the contact required time tp2 or t0 of the platen roller 70 or the discharge-side pinch roller 71b (FIG. 18) is constant. Actually, however, it is not constant. Let us consider this by using the platen roller 70. A distance L1 (FIG. 22(a)) is travelled by the platen roller 70 during the period from an instant that it starts to descend until it comes in press contact with the rear side of the document D. When the document D is thick as shown in FIG. 22(a), L1 is shorter than a distance L2 when the document D is thin as shown in FIG. 22(b). Accordingly, the time required taken for the platen roller 70 to start to descend and to comes into press contact with the rear side of the document D, that is, the contact required times, are also different.

Figure 23:
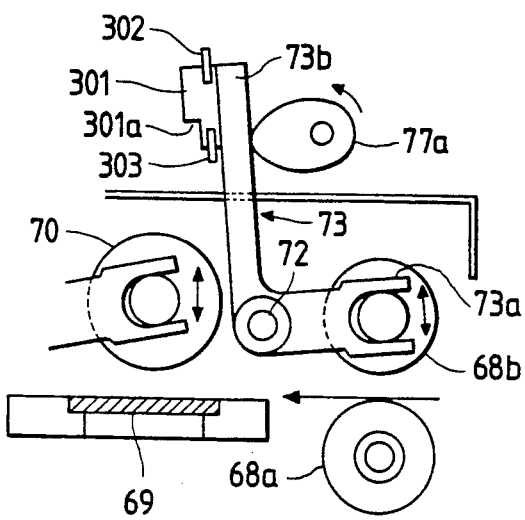
FIG. 23 is a partial sectional view showing an embodiment of document thickness detector.
Figure 24:
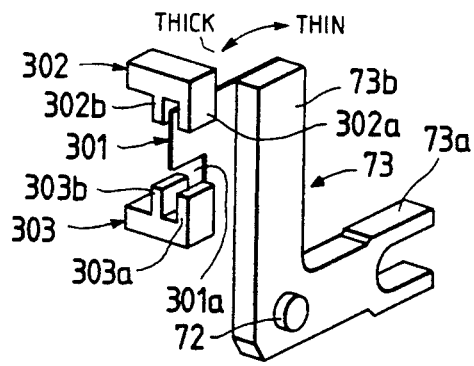
FIG. 24 is a perspective view showing a key portion of the thickness detector of FIG. 23.

To cope with this, in an embodiment shown in FIGS. 23 and 24, an actuator 301 with a stepped portion 301a is mounted on a second end 73b of the first arm 73, which rotatably supports the insert-side pinch roller 68b. The actuator 301 interrupts the optical paths between light emitting portions 302a and 303a and corresponding light receiving portions 302b and 303b of document thickness sensors 302 and 303 of the photo interrupt type to the thickness of the document D in a stepwise manner.

According to the thickness of the document D, the amount of rotation of the first arm 73 varies and consequently the actuator 301 moves. A combination of the output signals of the sensors 302 and 303 provides a measurement of the thickness of the document D. The thickness of the document D and the output signals of the sensors 302 and 303 are tabulated as in Table 1. In this case, the sensors are turned on when their optical paths are interrupted.

TABLE 1

| Document thick | Sensor 302 | Sensor 303 |
| --- | --- | --- |
| Thin | Off | Off |
| Medium | On | Off |
| Thick | On | On |

According to the thickness of the document D as sensed, a start time at which the platen roller 70 starts to descend is varied. When the document D is thick as shown in FIG. 22(a), the descending of the platen roller 70 starts late. When the document D is thin as shown in FIG. 22(b), the descent of the roller 70 starts earlier. With this, the thickness of the document D can be detected with high accuracy. The press contact position of the platen roller against the document D can be substantially fixed, and a displacement of the copy area can be remarkably reduced.

Figure 25:
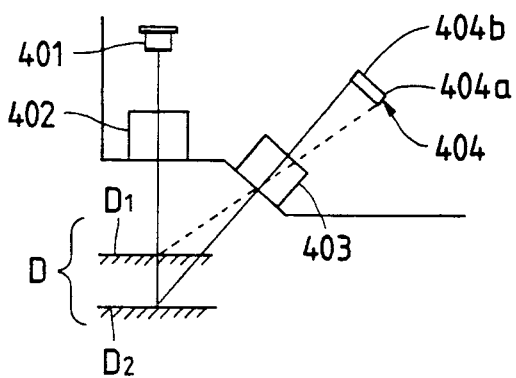
FIG. 25 is a partial sectional view showing another embodiment of a document thickness detector.

In the embodiment shown in FIGS. 23 and 24, the thickness if the document D is detected by utilizing the swing of the first arm 73. Alternatively, a document thickness sensor may be provided in the document transfer path. This approach follows. As shown in FIG. 25, laser light emitted from a semiconductor laser 401 is collected by a projection lens 402 and is applied to the rear side of the document D. The reflected light from the document D is focused on a photo position detect element 404, such as a CCD line sensor, through a light receiving lens 403. For a thick document D1, the reflected light is focused at one end 404a of the position detect element 404. For a thick document D2, the reflected light is focused at the other end 404b. The thickness of the document D can be determined by detecting the focusing position. In the embodiment shown in FIG. 25, the detection of the document thickness can be done in a stepless manner. Accordingly, the document can be pressed always at a fixed position, removing the displacement of the copy area.

It is evident that other type of sensors can be used.

As seen from the foregoing description, the embodiments thus far described can copy a large and thick document, such as a design board. However, if the document is greatly curved, improper copying may still occur.

Figure 26:
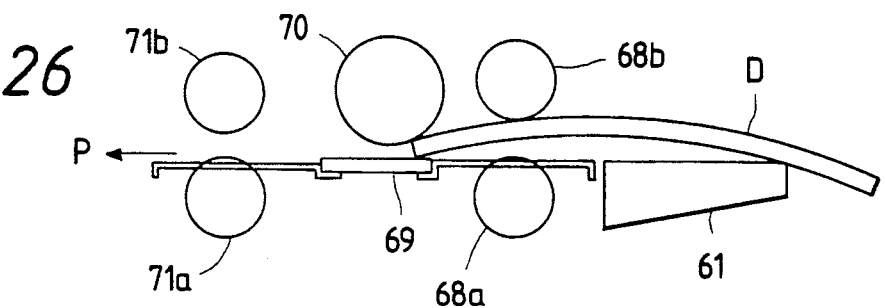
FIG. 26 shows a diagram for explaining how to read a curved document.

Let us consider a case where an image on a document D where the image is formed on a concave portion of the document as shown in FIG. 26. In this case, when the trailing edge of the document D approaches to the end of insertion-side tray 61, the central portion of the document D will be lifted out of the transfer path, and the image surface will be separated from the platen glass 69. This results in the defocussing. Further, where a color image is read by sequentially lighting the three color lights, image fogging will occur.

One of the possible approaches to prevent this is to increase the pressing force of the insertion-side pinch roller 68b, platen roller 70, and discharge-side pinch roller 71b. This would require also increase the drive torque required to transfer the document and consequently would likely increase the manufacturing cost.

Figure 27:
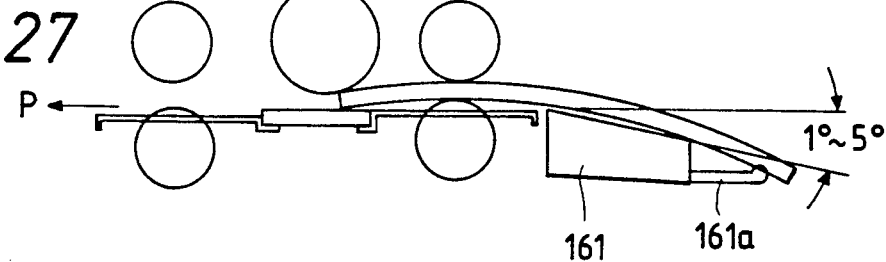
FIG. 27 is a side view showing the structure of an insertion tray suitable for reading a curved document.

To avoid this and to solve the problem, an embodiment shown in FIG. 27 provides that the upper surface of an insertion tray 161 is slanted 1 to 5 degrees with respect to the document transfer path P. With this, the central portion of the document is not lifted out of the transfer path even when the curved document D is read. Accordingly, the document will remain in close contact with the platen glass 69 to provide excellent image reading. In the figure, the transfer path P illustrating is horizontal, but it is set to be downwardly slanted as shown in FIGS. 1 and 4, for example.

Further, at one end of the insertion tray 161, an expandable tray 161a may be provided extending from the bottom surface of the tray 161. When a long document is transferred the expandable tray 161a supports the trailing portion the document to prevent it from dropping. Material of low friction coefficient or rollers are preferably applied to the portions of the insertion tray 161 and the expandable tray 161a where the trays contact the document to ensure a smooth transfer of the document.

As seen from the foregoing description, touching and detaching of the transfer roller pairs as provided in the document transfer section and touching and detaching of the platen roller against the platen glass are controlled according to the timings of the document transfer. This feature provides for easy insertion of a thick document and a reliable transfer of document. According to the present invention, the reading of image on a thick document, which is difficult in the prior art, is easy and reliable.

Immediately before the trailing edge of the document passes the platen roller, the roller is lifted from the platen glass. Therefore, the platen roller will never drop and directly hit the platen glass. This prevents the platen glass from being damaged.

The document transfer and the read operation are synchronized with the copy paper transfer and the image forming operation in a predetermined sequence. This enables an image within a specified area on an document to be copied on a specified area on a copy paper. During the copy of this type, the lifting motion of the platen roller is temporarily stopped. This successfully prevents the platen roller from dropping on the platen surface before the document transfer, and provides a smooth transfer of document. The control of the descent of each roller according to the document thickness prevents the copy position from being displaced.

Upstream of the insertion-side transfer roller pair is provided a feed tray slanted downwardly with respect to the document transfer path. With this feature, if a document to be copied is curved, the side of the docucment hearing the image will not be lifted from the platen glass.

The foldable discharge tray is provided downstream of the discharge-side transfer roller pair. Accordingly, if a heavy and thick document is read, an excessive weight is not applied to the transfer section. The problem of the damage of transfer section is solved. Usually, the tray is folded and not obstructive in copy work.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of reading an image of an original document conveyed along a document path having an insert-side into which the original document is introduced and a discharge side by which the original document exists the document path, the document path including in sequence insert-side transfer means for conveying the original document, a platen contact roller, and discharge-side transfer means for conveying the original document, a platen surface confronting the platen roller, the method comprising the steps of:

maintaining a position of the platen roller at a predetermined spacing from the platen surface prior to introducing the original document into the insert-side of the document path;

introducing the original document into the insert-side of the document path;

conveying the original document with the insert-side transfer means along the document path;

changing the position of the platen roller into a contact position in contact with the original document while the original document passes over the platen surface;

changing a spacing of the platen roller from the platen surface prior to a trailing edge of the original document passing under the platen roller such that after the trailing edge of the original document passes under the platen roller, the platen roller does not contact the platen surface; and conveying the document with the discharge-side transfer means to the discharge side of the document path.

2. The image reading method of claim 1 wherein the insert insert-side transfer means comprises a pair of insert-side transfer rollers, a spacing between the pair of insert-side rollers being controllable, the method including further steps of:

sensing the introduction of the original document into the insert-side of the document path; and reducing a spacing between the pair of insert-side rollers to pinch the original document when the original document is introduced into the insert-side of the document path.

3. The image reading method of claim 1 wherein the discharge-side transfer means comprises a pair of discharge side transfer rollers, a spacing between the pair of discharge-side rollers being controllable, the method including further steps of:

sensing a location of the original document relative to the pair of discharge-side rollers; and reducing a spacing between the pair of discharge-side rollers to pinch the original document after the original document is positioned therebetween.

4. The image reading method of claim 1 wherein a gate device is movably positioned near the insert-side of the document path to controllably block or permit conveyance of the original document along the document path, the method comprising further steps of:

sensing the introduction of the orginal document into the insert-side of the document path; and controlling the gate device to block conveyance of the original document along the document path for a predetermined period of time after introduction of the original document into the insert-side of the document path.

5. The image reading methof of claim 1 wherein the insert-side transfer means comprises a pair of insert-side transfer rollers and the discharge-side transfer means comprises a pair of discharge-side transfer rollers, a spacing between the pair of insert-side rollers being controllable to be positioned into or out of a contact position with the original document and a spacing between the pair of discharge-side rollers being controllable to be positioned into or out of a contact position with the original document, the method comprising further steps of:

sensing a location of the original document along the document path;

positioning the pair of insert-side rollers into the contact position to pinch the original document therebetween upon sensing the introduction of the original document into the insert-side of the document path;

positioning the pair of discharge-side rollers into the contact position to pinch the original document therebetween upon sensing the original document at a first predetermined location along the document path;

positioning the pair of insert-side rollers out of the contact position upon sensing the original document at a second predetermined location along the document path; and positioning the pair of discharge-side rollers out of the contact position upon sensing the original document at a third predetermined location along the document path.

6. The image reading method of claim 1, wherein a document illuminating source illuminates a document on the platen surface and an image sensor receives light reflected from the document on the platen surface, and wherein a shading correction plate is movable into and out of a position between the platen roller and the platen surface, the method comprising further steps, prior to conveying the original document along the document path, of:

moving the shading correction plate into the position between the platen roller and the platen surface;

illuminating the correction plate with the document illuminating source;

sensing, with the image sensor, light reflected from the shading correction plate and generating corresponding image signal levels; and determining shading correction data in accordance with the image signal levels.

7. The image reading method of claim 1 wherein a recording medium is transferred along an image transfer path of a recording unit, the method including further steps of:

scanning an image on the original document being conveyed along the document path to generate image signals;

transferring the recording medium along the image transfer path of the image recording unit in synchronism with the conveyance of the original document along the document path; and recording the image signals on the recording medium.

8. The image reading method according to claim 7, further including steps of:

stopping the conveyance of the original document at a predetermined location along the document path;

beginning the transfer of the recording medium in response to the stopping of the original document;

stopping the transfer of the recording medium at a predetermined location along the image transfer path; and restarting the conveyance of the original document in response to the stopping of the recording medium such that the conveyance of the original document along the document path and the transfer of the recording medium along the image transfer path are synchronized.

9. The image reading method according to claim 8, further including a step of establishing a synchronization time period during which the positioning of the platen roller into the contact position and out of the contact position is stopped in response to the original document reaching the fourth predetermined location along the document transfer path until the conveyance of the original document is restarted.

10. The image reading method according to claim 8, further including steps of:

detecting a thickness of the original document in the document path; and controlling a timing of initiating positioning of the platen roller to the contact position in accordance with the detected thickness of the original document.

11. The image reading method according to claim 10, wherein the step of controlling includes a step of starting the positioning of the platen roller to the contact position for a thin original document at a time that is before a time that positioning of the platen roller to the contact position is started for a thick document.

12. A device for reading an image of an original document conveyed along a document path, the document path having an insert-side and a discharge side, comprising:

insert-side transfer means for receiving the original document introduced at the insert-side of the document path and for conveying the original document;

a platen surface;

a platen roller in the document path and confronting the platen surface, the platen roller having a position that is controllably displaceable to adjust a spacing between the platen roller and the platen surface;

means for controlling the position of the platen roller to adjust the spacing between the platen roller and the platen surface;

discharge-side transfer means for conveying the original document to the discharge side of the document path; and the means for controlling including means for changing the position of the platen roller in accordance with whether or not the original document is between the platen roller and the platen surface.

13. The image reading device of claim 12 wherein the platen roller is controllably displaceable between an in contact position, in which the platen roller contacts the platen surface in the absence of the original document, and an out of contact position in which the platen roller is displaced from the platen surface by a predetermined spacing.

14. The image reading device of claim 12 wherein the insert-side transfer means comprises a pair of insert-side transfer rollers, a spacing between the pair of insert-side rollers being controllable, the device further including:

means for sensing introduction of the original document at the insert-side of the document path; and means, responsive to the sensing means, for reducing the spacing between the pair of insert-side rollers to pinch the original document when the original document is introduced at the insert-side of the document path.

15. The image reading device of claim 12 wherein the discharge-side transfer means comprises a pair of discharge-side transfer rollers, a spacing between the pair of discharge-side rollers being controllable, the device further including:
   means for sensing a location of the original document relative to the pair of discharge-side rollers; and
   means, responsive to the sensing means, for reducing the spacing between the pair of discharge-side rollers to pinch the original document when the original document is positioned therebetween.

16. The image reading device of claim 12 wherein the insert-side transfer means comprises a pair of insert-side transfer rollers and the discharge side transfer means comprises a pair of discharge-side transfer rollers, a spacing between the pair of insert-side rollers being controllable to be positioned into or out of a contact position and a spacing between the pair of discharge-side rollers being controllable to be positioned into or out of a contact position, the device further including:
   means for sensing a location of the original document along the document path ;
   means for postioning the pair of insert-side rollers into the contact position to pinch the original document therebetween upon sensing the introduction of the original document into the insert-side of the document path;
   means for positioning the pair of discharge-side rollers into the contact position to pinch the original document therebetween upon sensing the original document at a first predetermined location along the document path;
   means for positioning the insert-side rollers out of the contact position upon sensing the original document at a second predetermined location along the document path; and
   means for positioning the pair of discharge-side rollers out of the contact position upon sensing the original document at a third predetermined location along the document path.

17. The device of claim 12 further including:
   gate means, positioned along the document path near the insert-side, for controllably blocking or permitting conveyance of the original document along the document path;
   means for sensing introduction of the original document at the insert-side of the document path; and
   means, responsive to the sensing means, for controlling the gate means to block conveyance of the original document along the document path for a predetermined period of time after introduction of the original document at the insert-side of the document path.

18. An image reading device according to claim 12, further including a document feed tray slanted downward with respect to the document transfer path and provided upstream of, and in document conveyance communication with, the insert-side transfer means.

19. An image reading device according to claim 12, further including a document feed tray slanted upward with respect to the document path and provided upstream of, and in document conveyance communication with, the insert-side transfer means to support curved original documents such that the curved documents are supported to contact the platen surface in the document path.

20. An image reading device according to claim 12, further including an original document discharge tray provided downstream of the discharge-side transfer means and in document conveyance communication with the document path to receive documents conveyed along the document path, the original document discharge tray being rotatable between a document receiving position and a stored position.

21. An image reading device according to claim 12, further including means for detecting a thickness of the original document in the document path and initiating means for controlling an initiation of the positioning of the platen roller in accordance with the detected thickness.

22. An image reading device according to claim 22, wherein the initiation means causes initiation of positioning the platen roller for a thin document at a time preceding a time for initiating positioning of the platen roller for a thick document.

23. An image reading device according to claim 21, wherein the insert-side transfer means comprises a pair of insert-side transfer rollers and wherein the document thickness detecting means comprises:
   optical sensor means for generating an output signal;
   level means, operatively coupled to the pair of insert-side transfer rollers, for being displaced by an amount corresponding to the thickness of the original document conveyed through the pair of insert-side transfer rollers; and
   light shield means, operatively coupled to the level means, for cooperating with the optical sensor means to cause the optical sensor means to output a signal indicating the thickness of the original document conveyed by the pair of insert-side transfer rollers.

24. An image reading device according to claim 23, wherein the optical sensor means comprises first and second optical sensors for producing outputs; and
   the image reading device further including gate means for logically combining the outputs of the first and second optical sensors to indicate the thickness of the original document.

25. An image reading device according to claim 21, wherein the document thickness detecting means comprises:
   a light source for illuminating the original document; and
   light sensor means for receiving light reflected from the original document and for detecting the thickness of the original document in accordance with the received light.

26. An image reading device according to claim 25, wherein the light sensor means comprises a CCD line sensor.

27. An image reading device according to claim 25, wherein the light source comprises a semiconductor laser.

28. An image reading device according to claim 12, wherein the insert-side transfer means comprises a pair of insert-side transfer rollers, the device further including:
   a cam driving motor;
   a first cam member rotated by the cam driving motor; and
   a first arm for contacting with the first cam member and connected to one of the pair of insert-side transfer rollers to displace the one insert-side transfer roller into and out of contact with the other of the pair of insert-side transfer rollers in response to the rotation of the first cam member.

29. An image reading device according to claim 28, the means for controlling the position of the platen roller including:
- a second cam member rotated by the cam driving motor; and
- a second arm for contacting with the second cam member and connected to the platen roller to displace the platen roller to positions into and out of contact with the platen in response to the rotation of the second cam member.

30. An image reading device according to claim 29, wherein the discharge-side transfer means comprising a pair fo discharge-side transfer rollers, the device further including:
- a third cam member rotated by the cam driving motor; and
- a third arm for contacting with the third cam member and connected to one of the pair of discharge-side transfer rollers to displace the one discharge-side transfer roller into and out of contact with the other of the pair of discharge-side transfer rollers in response to the rotation of the third cam member.

31. An image reading device according to claim 30, wherein the first cam member, the second cam member, and the third cam member have respective cam surfaces to first displace the one insert-side transfer roller out of contact with the other of the pair of insert-side transfer rollers, to displace the platen roller out of contact with the platen surface, and to subsequently displace the one discharge-side transfer roller out of contact with the other of the pair of discharge-side transfer rollers.

32. A device for reading and recording an image on an original document conveyed along a document path, the document path having an insert-side and a discharge side, comprising:
- a pair of insert-side transfer rollers for receiving the original document introduced at the insert-side of the document path and for conveying the original document;
- a platen surface;
- a platen roller in the document path and confronting the platen surface, the platen roller having a position that is controllably displaceable to adjust a space between the platen roller and the platen surface;
- means for controlling the position of the platen roller to adjust the spacing between the platen roller and the platen surface;
- a pair of discharge-side transfer rollers for conveying the original document to the discharge side of the document path;
- the means for controlling including means for changing the position of the platen roller in accordance with whether or not the original document is between the platen roller and the platen surface;
- a document illuminating source for illuminating a document on the platen surface;
- shading correction plate means, rotatably mounted on the platen roller, for being positioned into or out of a position between the platen roller and the platen surface;
- image sensing means for receiving light from the illuminating source reflected by the shading plate means when the shading plate means is positioned between the platen roller and the platen surface and for generating corresponding image signal levels; and
- means for determining shading correction data in accordance with the image signal levels.

33. The image reading and recording device of claim 32 further including means for sensing the introduction of the original document into the insert-side of the document path; and
- means, responsive to the sensing means, for positioning the plate means between the platen roller and the platen surface after insertion of the original document into the insert-side of the document path and prior to conveying the original document along the document path.

34. A device for reading and recording an image on an original document conveyed along a document path, the document path having an insert-side and a discharge side, comprising:
- a pair of insert-side transfer rollers for receiving the original document introduced at the insert-side of the document path and for conveying the original document;
- a platen surface;
- a platen roller in the document path and confronting the platen surface, the platen roller having a position that is controllably displaceable to adjust a spacing between the platen roller and the platen surface;
- means for controlling the position of the platen roller to adjust the spacing between the platen roller and the platen surface;
- a pair of discharge-side transfer rollers for conveying the original document to the discharge side of the document path;
- wherein the means for controlling includes means for changing the position of the platen roller in accordance with whether or not the original document is between the platen roller and the platen surface;
- means for sensing a location of the original document along the document path;
- means for sensing an image of the original document while the original document is conveyed across the platen surface and for generating image signals corresponding to the scanned image;
- an image recording unit having an image transfer path;
- means for transferring a recording medium along the image transfer path of the image recording unit in synchronism with the conveyance of the original document along the document path; and
- means for recording the image signals on the recoring medium.

* * * * *

UNITED STATES PATENT AND TRADEMARK OFFICE
CERTIFICATE OF CORRECTION

PATENT NO. : 5,130,807

DATED : July 14, 1992

INVENTOR(S) : Eiichi Tanabe, et al

It is certified that error appears in the above-identified patent and that said Letters Patent is hereby corrected as shown below:

Title Page, item [54] and in Col. 1, line 4, in the title change "THICKNESS" to --THICKNESSES--.

Claim 1, column 20, line 2, change "exists" to --exits--.

Claim 2, column 20, line 31, Delete "insert" (First Occurrence).

Claim 4, column 20, line 56, change "original" to --original--.

Claim 5, column 20, line 63, change "methof" to --method--.

Claim 16, column 23, line 22, change "path ;" to --path;--; and line 23, change "postioning" to --positioning--.

Claim 22, column 24, line 13, change "claim 22" to --claim 21--.

Claim 30, column 25, line 12, change "comprising" to --comprises--; and line 13, change "fo" to --of--.

UNITED STATES PATENT AND TRADEMARK OFFICE
CERTIFICATE OF CORRECTION

PATENT NO. : 5,130,807

DATED : July 14, 1992

INVENTOR(S) : Eiichi Tanabe, et al

It is certified that error appears in the above-identified patent and that said Letters Patent is hereby corrected as shown below:

Claim 32, column 25, line 44, change "space" to --spacing--.
Claim 34, column 26, line 57, change "recoring" to --recording--.

Signed and Sealed this

Fifth Day of October, 1993

Attest:

BRUCE LEHMAN

*Attesting Officer*     Commissioner of Patents and Trademarks